United States Patent
Zhou et al.

(10) Patent No.: US 11,989,843 B2
(45) Date of Patent: May 21, 2024

(54) ROBOTIC LEARNING OF ASSEMBLY TASKS USING AUGMENTED REALITY

(71) Applicant: Snap Inc., Santa Monica, CA (US)

(72) Inventors: Kai Zhou, Wiener Neudorf (AT); Adrian Schoisengeier, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/846,930

(22) Filed: Jun. 22, 2022

(65) Prior Publication Data

US 2023/0419615 A1 Dec. 28, 2023

(51) Int. Cl.
| | |
|---|---|
| *G06T 19/00* | (2011.01) |
| *B25J 13/08* | (2006.01) |
| *G06F 3/01* | (2006.01) |
| *G06T 17/00* | (2006.01) |
| *G06T 19/20* | (2011.01) |

(Continued)

(52) U.S. Cl.
CPC ............. *G06T 19/006* (2013.01); *B25J 13/08* (2013.01); *G06F 3/012* (2013.01); *G06F 3/017* (2013.01); *G06T 17/00* (2013.01); *G06T 19/20* (2013.01); *G06V 20/64* (2022.01); *G06T 2200/08* (2013.01); *G06T 2210/56* (2013.01); *G06T 2219/2016* (2013.01)

(58) Field of Classification Search
CPC ....... G06T 19/006; G06T 17/00; G06T 19/20; G06T 2200/08; G06T 2219/2016; G06V 20/64; B25J 13/08; G06F 3/012; G06F 3/017
See application file for complete search history.

(56) References Cited

U.S. PATENT DOCUMENTS

| | | |
|---|---|---|
| 2013/0346348 A1 | 12/2013 | Buehler et al. |
| 2016/0257000 A1* | 9/2016 | Guerin .................. B25J 9/1671 |
| 2018/0173323 A1* | 6/2018 | Harvey .................. G06F 3/011 |

(Continued)

FOREIGN PATENT DOCUMENTS

| | | |
|---|---|---|
| WO | 2020006146 | 1/2020 |
| WO | 2023250267 | 12/2023 |

OTHER PUBLICATIONS

"International Application Serial No. PCT/US2023/068380, International Search Report dated Oct. 10, 2023", 4 pgs.

(Continued)

*Primary Examiner* — Abderrahim Merouan
(74) *Attorney, Agent, or Firm* — Schwegman Lundberg & Woessner, P.A.

(57) ABSTRACT

A method for programming a robotic system by demonstration is described. In one aspect, the method includes displaying a first virtual object in a display of an augmented reality (AR) device, the first virtual object corresponding to a first physical object in a physical environment of the AR device, tracking, using the AR device, a manipulation of the first virtual object by a user of the AR device, identifying an initial state and a final state of the first virtual object based on the tracking, the initial state corresponding to an initial pose of the first virtual object, the final state corresponding to a final pose of the first virtual object, and programming by demonstration a robotic system using the tracking of the manipulation of the first virtual object, the first initial state of the first virtual object, and the final state of the first virtual object.

20 Claims, 24 Drawing Sheets

(51) Int. Cl.
  *G06V 20/64*  (2022.01)
  *G06V 40/10*  (2022.01)

(56) References Cited

U.S. PATENT DOCUMENTS

| | | | | |
|---|---|---|---|---|
| 2019/0344441 | A1* | 11/2019 | Rottmann | B25J 9/1633 |
| 2020/0117212 | A1* | 4/2020 | Tian | G01C 21/206 |
| 2021/0220737 | A1* | 7/2021 | Fish | A63F 13/32 |
| 2021/0378768 | A1* | 12/2021 | Olson | A61B 34/25 |
| 2022/0055213 | A1* | 2/2022 | Kang | B25J 9/1666 |
| 2022/0409996 | A1* | 12/2022 | Gonzalez Franco | G06F 3/016 |

OTHER PUBLICATIONS

"International Application Serial No. PCT/US2023/068380, Written Opinion dated Oct. 10, 2023", 8 pgs.

Aleotti, Jacopo, "Programming manipulation tasks by demonstration in visuo-haptic augmented reality", IEEE International Symposium On Haptic, Audio And Visual Environments And Games (HAVE) Proceedings, IEEE, pp. 13-18, (Oct. 10, 2014), 6 pgs.

Cao, Yuanzhi, "GhostAR: A Time-space Editor for Embodied Authoring of Human-Robot Collaborative Task with Augmented Reality", User Interface Software And Technology, ACM, 2 Penn Plaza, Suite 701 New York, NY 10121-0701 USA, (Oct. 17, 2019), 521-534.

Rudorfer, Martin, "Holo Pick'n'Place", IEEE 23rd International Conference On Emerging Technologies And Factory Automation (ETFA, IEEE vol. 1, (Sep. 4, 2018), 1219-1222.

Aleotti, Jacopo, "Grasp programming by demonstration in virtual reality with automatic environment reconstruction", Virtual Reality, vol. 16, https://doi.org/10.1007/s10055-010-0172-8, (2012), 87-104.

Ding, Guanwen, "A Task-Learning Strategy for Robotic Assembly Tasks from Human Demonstrations", Sensors, 20, 5505; doi: 10.3390/s20195505, (2020), 23 pgs.

Kyrarini, Maria, "Robot learning of industrial assembly task via human demonstrations", Autonomous Robots, 43, https://doi.org/10.1007/s10514-018-9725-6, (2019), 239-257.

* cited by examiner

ROBOTIC LEARNING OF ASSEMBLY TASKS USING AUGMENTED REALITY

TECHNICAL FIELD

The subject matter disclosed herein generally relates to an augmented reality system. Specifically, the present disclosure addresses systems and methods for robotic learning of assembly tasks using augmented reality.

BACKGROUND

Robots can be taught new skills using programming by demonstration (PbD). An operator teaches a robot by physically demonstrating a task: the operator manually moves components (e.g., arms, gripper, physical objects) of the robot through a set of sequential configurations (e.g., position, orientation of the components) to demonstrate the task. Multiple sensors are disposed in the physical environment to capture the set of sequential configurations. However, some robots and physical objects can be too large, too heavy, too fragile, or too dangerous for the operator.

Robots can also be programmed using PbD in a complete virtual environment using a virtual reality (VR) device. The operator teaches the robot by manipulating VR grips or controllers. However, complex physical environment may require extensive computational resources to be recreated in a VR setting.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
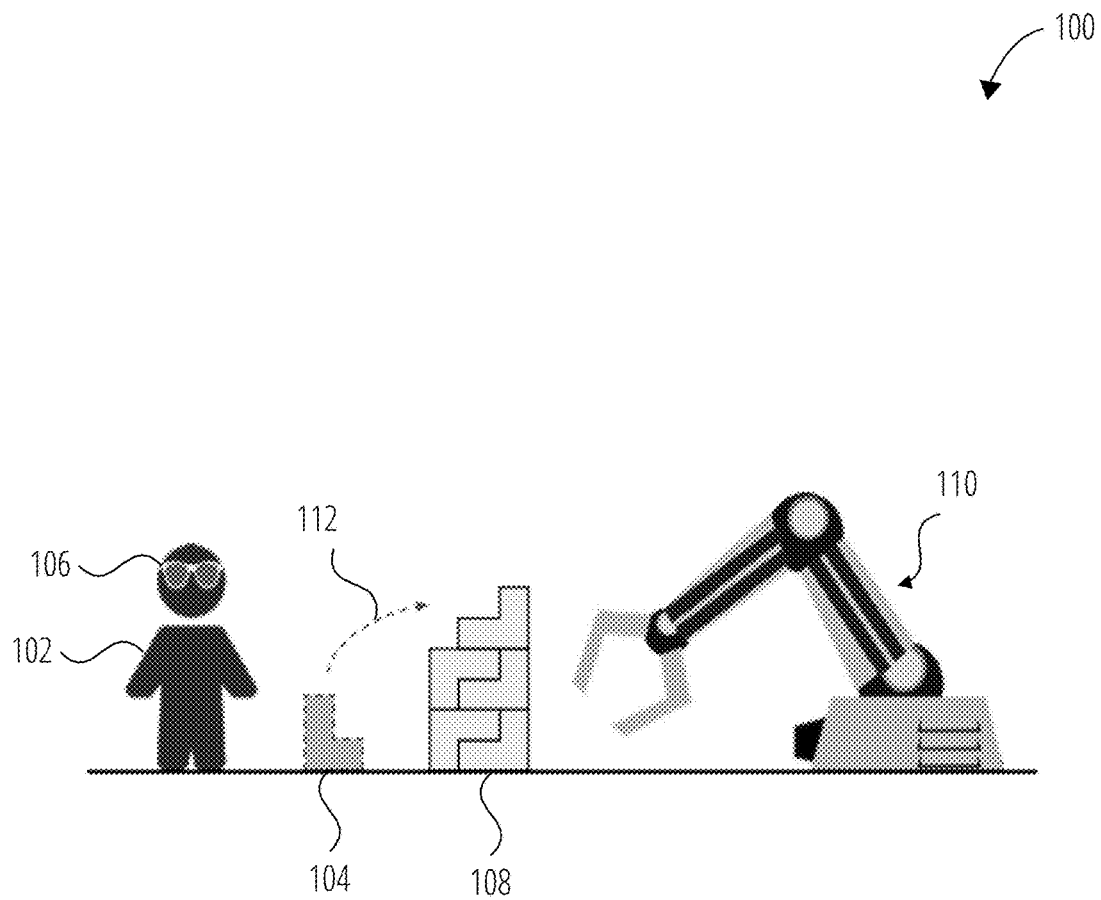
FIG. 1 is a block diagram illustrating an environment for programming a robotic system using an AR device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). The term "AR" can also refer to a device (e.g., AR device) or a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience. AR/VR applications enable a user to access information, such as in the form of virtual content rendered in a display of an AR/VR device. The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to a physical object of interest. In order to do this, the AR display device detects the physical object and tracks a pose of the AR display device relative to a position of the physical object. A pose identifies a position and orientation of the display device relative to a frame of reference or relative to another object. For VR, the virtual object appears at a location (in the virtual environment) based on the pose of the VR display device. The virtual content is therefore refreshed based on the latest position of the device.

The term "visual tracking system" is used herein to refer to a computer-operated application or system that enables a system to track visual features identified in images captured by one or more cameras of the visual tracking system, and build a model of a real-world environment based on the tracked visual features. Non-limiting examples of the visual tracking system include: a Visual Simultaneous Localization and Mapping system (VSLAM), and Visual-Inertial Simultaneous Localization and Mapping system (VI-SLAM). VSLAM can be used to build a target from an environment or a scene based on one or more cameras of the visual tracking system. VI-SLAM (also referred to as a visual-inertial tracking system) determines the latest position or pose of a device based on data acquired from multiple sensors (e.g., depth cameras, inertial sensors) of the device.

The term "hand gesture" is used herein to refer to movement of a user's hands. The term can also refer to digital image processing and gesture recognition that tracks movement of hand and wrist, determines various hand and wrist gestures, and sends relevant data to computer devices in order to emulate data input devices, to recognize mapped gesture commands, and to simulate hand motion.

The term "programming by demonstration" (PbD) is used herein to refer to a technique for a human operator to teach a computer or a robot a new task/skill/behavior by demonstrating the task to transfer directly instead of programming the computer/robot through machine commands. After a task is demonstrated by the human operator, the trajectory is stored in a database. The robot can perform or reproduce a taught task by recalling the trajectory corresponding to a skill in a skill library in the database.

The present application describes a method for training a robotic system a new skill by demonstrating the new skill with a human operator using an AR device. In particular, the present application describes a method for training the robotic system using PbD with a human operator demonstrating in a physical environment with a combination of virtual and physical objects (as opposed to only physical objects in a physical environment or only virtual objects in a VR environment; demonstrating a task with real physical objects can be more tiring or dangerous, and/or require connecting to a sophisticated interface with other larger and complex objects (e.g., harder to build pure virtual world).

The AR device of the present application enables the human operator to demonstrate parts of the assembly task using virtual objects. The human operator wears the AR device (e.g., AR glasses) that includes sensors for capturing 3D human motion (e.g., human operator hand gestures), poses of physical objects, and poses of virtual objects. The captured data is then fed to the PbD system (located in the AR device, in a server, or in the robotic system). The PbD system learns the new task so that the robotic system can subsequently reproduce the task by operating on further physical objects. The PbD robotic system can learn from the motion of the human operator, the motion of the virtual/real objects, and apply the learned strategy for various robotic systems.

In one example embodiment, a method includes displaying a first virtual object in a display of an augmented reality (AR) device, the first virtual object corresponding to a first physical object in a physical environment of the AR device, tracking, using the AR device, a manipulation of the first virtual object by a user of the AR device, the manipulation of the first virtual object being relative to a second physical object in the physical environment or a second virtual object corresponding to the second physical object, identifying an initial state and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, and programming by demonstration a robotic system using the tracking of the manipulation of the first virtual object relative to the second physical object or the second virtual object, the first initial state of the first virtual object, and the final state of the first virtual object.

As a result, one or more of the methodologies described herein facilitate solving the technical problem of programming a robotic system in a real physical environment. The presently described method provides an improvement to an operation of the functioning of a computer by tracking the human operator manipulating a virtual object, tracking the trajectory and pose of the virtual object, and programming the robotic system based on the tracking and the trajectory and the pose of the virtual object. Furthermore, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a block diagram illustrating a physical environment 100 for programming a robotic system using an AR device in accordance with one example embodiment. The physical environment 100 includes a human operator 102 wearing an AR device 106, a robotic system 110, and a physical object 108. The human operator 102 operates a virtual object 104 (e.g., picks up, lifts, moves, manipulates, rotates) displayed in the AR device 106.

The AR device 106 includes a computing device having a display (e.g., wearable computing device, a smartphone, a tablet computer). The wearable computing device may be removable mounted to a head of the human operator 102. In one example, the display includes a screen that displays images captured with the cameras of the AR device 106. In another example, the display of the AR device 106 may be transparent such as in lenses of wearable computing glasses. In other examples, the display may be non-transparent, partially transparent, or partially opaque. In yet other examples, the display may be wearable by the human operator 102 to partially cover the field of vision of the human operator 102.

The AR device 106 includes an AR application (not shown) that causes a display of virtual content (e.g., virtual object 104) based on images of physical objects (e.g., physical object 108) detected with a sensor (e.g., camera) of the AR device 106. For example, the human operator 102 may point one or more cameras of the AR device 106 to capture an image of the physical object 108. The physical object 108 is within a field of view of a camera of the AR device 106. The AR application generates virtual content (e.g., virtual object 104) corresponding to an identified object (e.g., physical object 108) in the image and presents the virtual content in a display (not shown) of the AR device 106.

Furthermore, the AR device 106 includes a tracking system (not shown). The tracking system tracks the pose (e.g., position and orientation) of the AR device 106, the hands of the human operator 102 relative to the physical environment 100, the physical object 108, and/or the robotic system 110 using, for example, optical sensors (e.g., depth-enabled 3D camera, image camera), inertial sensors (e.g., gyroscope, accelerometer), magnetometer, wireless sensors (Bluetooth, Wi-Fi), GPS sensor, and audio sensor. In one example, the tracking system includes a visual Simultaneous Localization and Mapping system (VSLAM) that operates with one or more cameras of the AR device 106. In one example, the AR device 106 displays virtual content based on the hand gestures of the human operator 102, the pose of the AR device 106 relative to the physical environment 100 and/or the physical object 108 (as determined by the tracking system 414) and/or the robotic system 110. The tracking system tracks a manipulation (e.g., movement 112) of the virtual object 104 by the human operator 102 based on hand gestures of the human operator 102 (e.g., the human operator 102 carrying the virtual object 104 to the physical object 108). The tracking system is described in more detail below with respect to FIG. 5.

The AR device 106 determines an initial state of the virtual object 104 and a final state (also referred to as a target state) of the virtual object 104 based on the tracking data. The AR device 106 generates (using PbD) a program for the robotic system 110 based on the initial state of the virtual object 104, the final state of the virtual object 104, and the tracking data. The AR device 106 provides the program to the robotic system 110. In another example, the AR device 106 provides the initial state of the virtual object 104, the final state of the virtual object 104, and the tracking data to the robotic system 110 (for the robotic system 110 to program). It is noted that the AR device 106 relies on sensor data from sensors at the AR device 106 to program the robotic system 110. In other words, the physical environment 100 does not include static sensors (external to the AR device 106) that are disposed in the physical environment 100; as such, in one example, no sensors external to the AR device 106 are used to program the robotic system 110.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

In one example, the AR device 106 communicates with the robotic system 110 via a wireless signal (e.g., Bluetooth). In another example, the AR device 106 communicates with the robotic system 110 via a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2A:
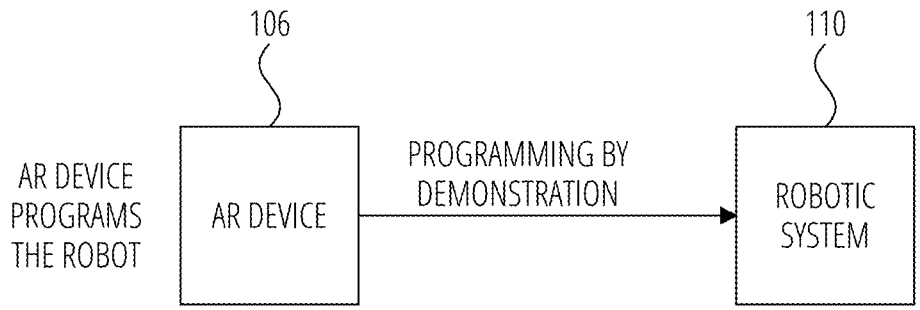
FIG. 2A a block diagram illustrating programming a robotic system in accordance with a first example embodiment.

FIG. 2A a block diagram illustrating programming the robotic system 110 in accordance with a first example embodiment. The AR device 106 programs the robotic system 110 using PbD based on the sensor data (e.g., virtual object manipulation, virtual object 6 degrees-of-freedom (6DOF) trajectory, initial state of the virtual object, final state of the virtual object, intermediate states of the virtual objects based on the 6DOF trajectory) from the AR device 106.

Figure 2B:
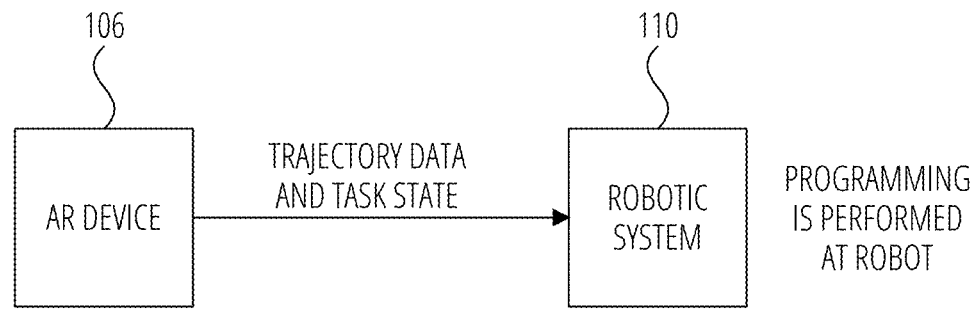
FIG. 2B a block diagram illustrating programming a robotic system in accordance with a second example embodiment.

FIG. 2B a block diagram illustrating programming the robotic system 110 in accordance with a second example embodiment. The AR device 106 provides the sensor data (e.g., virtual object manipulation, virtual object 6 degrees-of-freedom (6DOF) trajectory, initial state of the virtual object, final state of the virtual object, intermediate states of the virtual objects based on the 6DOF trajectory) to the robotic system 110. The robotic system 110 is programmed at the robotic system 110 using PbD based on the sensor data.

Figure 2C:
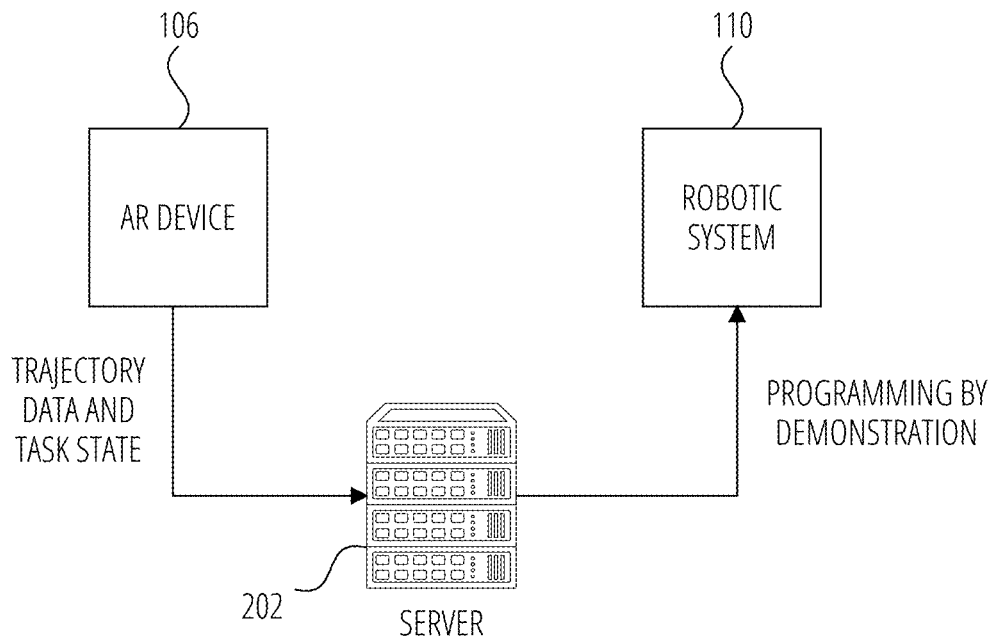
FIG. 2C a block diagram illustrating programming a robotic system in accordance with a third example embodiment.

FIG. 2C a block diagram illustrating programming the robotic system 110 in accordance with a third example embodiment. The AR device 106 provides sensor data (e.g., virtual object manipulation, virtual object 6 degrees-of-freedom (6DOF) trajectory, initial state of the virtual object, final state of the virtual object, intermediate states of the virtual objects based on the 6DOF trajectory) to a server 202. The server 202 programs the robotic system 110 using PbD based on the sensor data. The server 202 communicates the program to the robotic system 110.

Figure 3A:
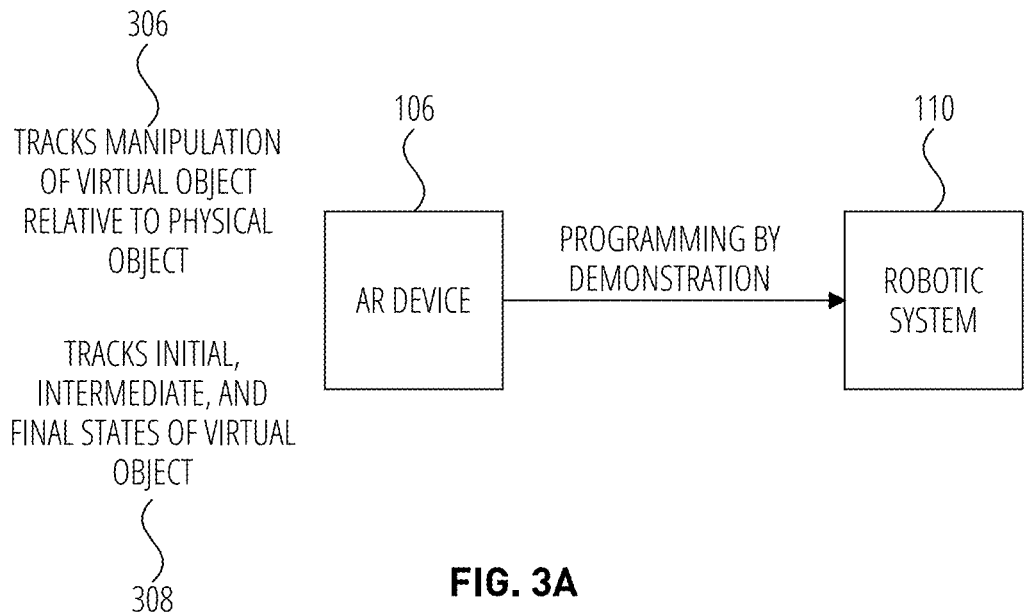
FIG. 3A is a block diagram illustrating programming a robotic system using an AR device in accordance with a first example embodiment.

FIG. 3A is a block diagram illustrating programming the robotic system 110 using the AR device 106 in accordance with a first example embodiment. The AR device 106 tracks manipulation of the virtual object 104 relative to the physical object 108 at operation 306. In one example, virtual object 104 represents a virtual component A to be coupled with a physical component B, such as physical object 108. In another example, virtual object 104 is a virtual component A representing a physical component A in the physical environment 100 to be coupled with the physical component B, such as physical object 108.

The AR device 106 also tracks initial, intermediate, and final states of the virtual object 104 at 308. The AR device 106 generates a program, using PbD, based on the tracking data. The AR device 106 communicates the program to the robotic system 110 for programming.

Figure 3B:
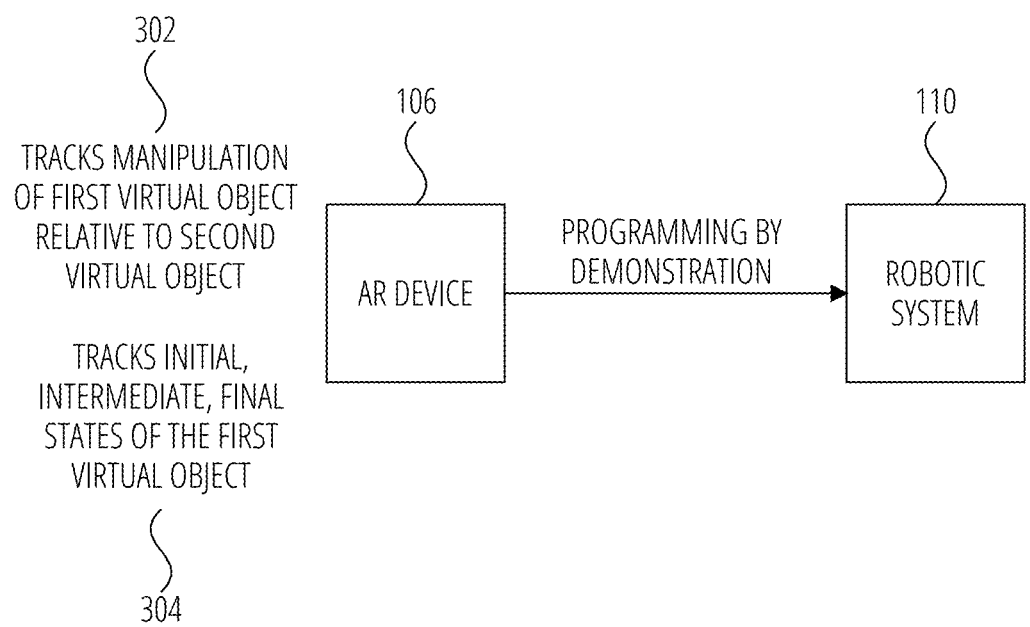
FIG. 3B is a block diagram illustrating programming a robotic system using an AR device in accordance with a second example embodiment.

FIG. 3B is a block diagram illustrating programming the robotic system 110 using the AR device 106 in accordance with a second example embodiment. The AR device 106 tracks a manipulation of a first virtual object relative to a second virtual object at 302. In one example, the first virtual object represents a virtual component A based on a first physical component A in the physical environment 100. The second virtual object represents a virtual component B based on a second physical component B in the physical environment 100.

The AR device 106 tracks initial, intermediate, final states of the first virtual object at 304. In one example, the states and tracked trajectories are relative to the first and second virtual objects. The AR device 106 maps the states and tracked trajectories from the first and second virtual objects to the first and second physical objects and generates a program, using PbD, based on the tracking data. The AR device 106 generates a program, using PbD, based on the mapped tracking data. The AR device 106 communicates the program to the robotic system 110 for programming.

Figure 4:
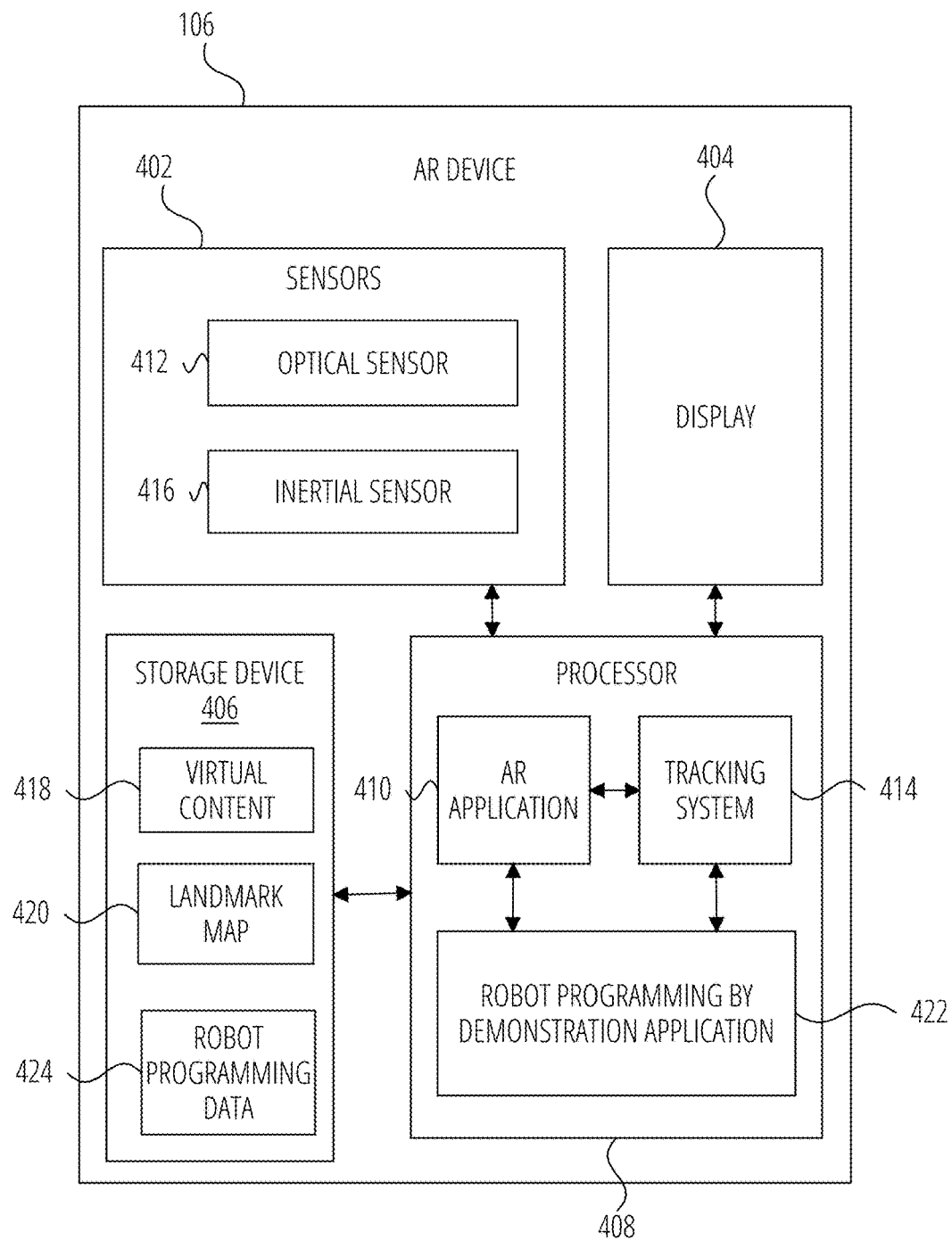
FIG. 4 is a block diagram illustrating an AR device in accordance with one example embodiment.

FIG. 4 is a block diagram illustrating modules (e.g., components) of the AR device 106, according to some example embodiments. The AR device 106 includes sensors 402, a display 404, a processor 408, and a storage device 406. Non-limiting examples of AR device 106 include a wearable computing device, a mobile computing device (such as a smart phone or smart tablet), a navigational device, a portable media device.

The sensors 402 include, for example, optical sensor 412 (e.g., camera such as a color camera, a thermal camera, a depth sensor and one or multiple grayscale tracking cameras), an inertial sensor 416 (e.g., gyroscope, accelerometer, magnetometer). In one example, the optical sensor 412 includes one or more cameras (e.g., human-visible light camera, infrared camera, TOF camera).

Other examples of sensors 402 include a proximity or location sensor (e.g., near field communication, GPS, Bluetooth, Wifi), an audio sensor (e.g., a microphone), or any suitable combination thereof. It is noted that the sensors 402 described herein are for illustration purposes and the sensors 402 are thus not limited to the ones described above.

The display 404 includes a screen or monitor configured to display images generated by the processor 408. In one example embodiment, the display 404 may be transparent or partially transparent so that the human operator 102 can see through the display 404 (in AR use case). In another example, the display 404 includes a touchscreen display configured to receive a user input via a contact on the touchscreen display.

The processor 408 includes an AR application 410, a tracking system 414, and a robot programming by demonstration application 422. The AR application 410 maps and detects objects in the physical environment 100 using computer vision based on the detected features of the physical environment 100 processed by the tracking system 414. The AR application 410 accesses virtual content (e.g., 3D object model) based on detected and identified physical objects (e.g., physical object 108) in the physical environment 100. The AR application 410 renders the virtual object 104 in the display 404. In one example embodiment, the AR application 410 includes a local rendering engine that generates a visualization of virtual content overlaid (e.g., superimposed upon, or otherwise displayed in tandem with) on an image of the physical object 108 captured by the optical sensor 412.

The human operator 102 can manipulate the virtual object 104 based on hands gestures (e.g., pose (location, orientation) of the hands of the human operator 102, tracked trajectories of the hands in the physical environment 100 relative to the physical object 108 or another physical/virtual object or frame of reference). The virtual object 104 appears anchored to the hands of the human operator 102 once the AR device 106 detects that the hands of the human operator 102 reach or touch the virtual object 104.

The tracking system 414 estimates a pose of the AR device 106. For example, the tracking system 414 uses image data and corresponding inertial data from the optical sensor 412 and the inertial sensor 416 to track a location and pose of the AR device 106 relative to a frame of reference (e.g., detected features in the physical environment 100). In one example embodiment, the tracking system 414 operates independently and asynchronously from the AR application 410. For example, the tracking system 414 operates offline without receiving any tracking request from the AR application 410. In another example, the tracking system 414 operates when the AR application 410 is running on the AR device 106.

In one example embodiment, the tracking system 414 uses the optical sensor 412 in a 6DOF (degrees of freedom) tracking to gather 3D information (e.g., features) about the physical environment 100. Example components of the tracking system 414 are described in more detail below with respect to FIG. 5.

The storage device 406 stores virtual content 418, landmark map 420, and robot programming data 424. The virtual content 418 includes, for example, a database of visual references (e.g., images of physical objects) and corresponding experiences (e.g., two-dimensional or three-dimensional virtual object models). The landmark map 420 stores a map of an environment based on features detected by the tracking system 414. The robot programming data 424 include, for example, sensor data such as virtual object manipulation, virtual object 6 degrees-of-freedom (6DOF) trajectory, initial state of the virtual object, final state of the virtual object, intermediate states of the virtual objects based on the 6DOF trajectory. In another example, the robot programming data 424 includes the programming data based on an output of the robot programming by demonstration application 422.

Any one or more of the modules described herein may be implemented using hardware (e.g., a Processor of a machine) or a combination of hardware and software. For example, any module described herein may configure a Processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
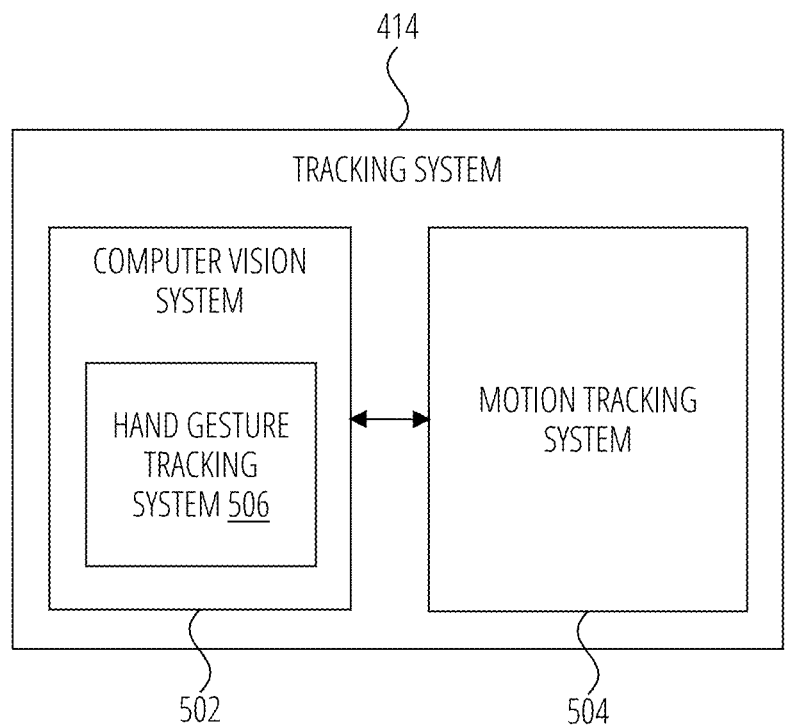
FIG. 5 is a block diagram illustrating a tracking system in accordance with one example embodiment.

FIG. 5 is a block diagram illustrating the tracking system 414 in accordance with one example embodiment. The tracking system 414 includes a computer vision system 502 and a motion tracking system 504. The computer vision system 502 maps and detects objects in the physical environment 100 using computer vision based on detected features of the physical environment 100. In one example, the tracking system 414 captures 3D spatial information of the physical environment 100 seen in a current field of view of the optical sensor 412. The tracking system 414 generates a global 3D map (e.g., 3D point cloud) by combining multiple such data points.

The hand gesture tracking system 506 includes a hand gesture recognition application that translates hands gestures (e.g., waving, grasping, pointing) of the human operator 102 into user input. In one example, the hand gesture tracking system 506 tracks the hands gestures (e.g., hands in a flat position to hold/contain a virtual object) for moving virtual objects in the physical environment 100.

The motion tracking system 504 tracks a pose (e.g., a current location and orientation) of the human operator 102/AR device 106. In another example, the motion tracking system 504 tracks the trajectory of the AR device 106 and/or the hands of the human operator 102 relative to the physical environment 100 (or relative to the physical object 108). The motion tracking system 504 can be used to track initial, intermediate, and final states of virtual/physical objects based on the trajectories of the virtual/physical objects.

Figure 6:
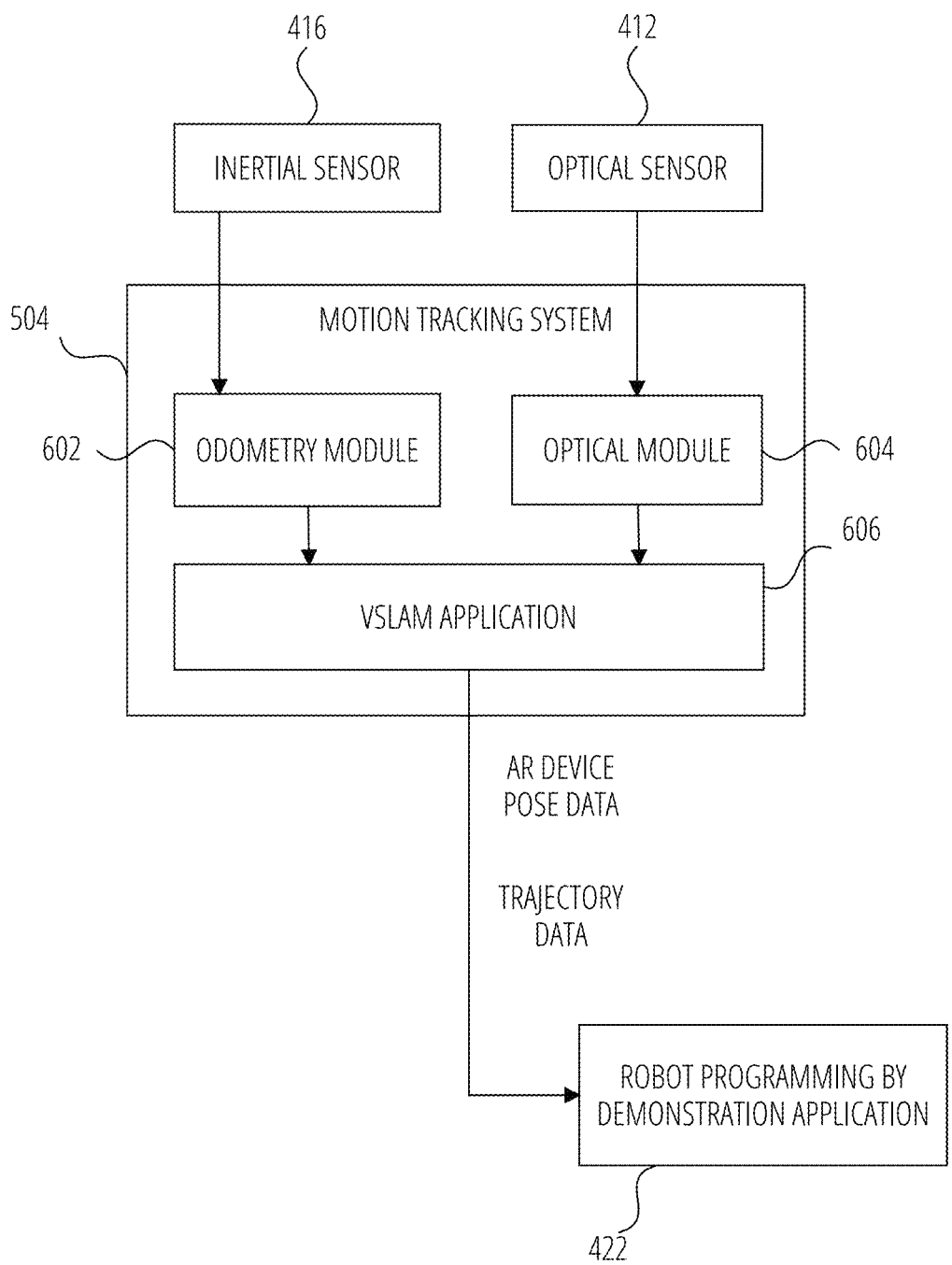
FIG. 6 is a block diagram illustrating a motion tracking system in accordance with one example embodiment.

FIG. 6 illustrates the motion tracking system 504 in accordance with one example embodiment. The motion tracking system 504 includes, for example, an odometry module 602, an optical module 604, a VSLAM application 606. The odometry module 602 accesses inertial sensor data from the inertial sensor 416. The optical module 604 accesses optical sensor data from the optical sensor 412.

The VSLAM application 606 determines a pose (e.g., location, position, orientation) of the AR device 106 relative to a frame of reference (e.g., physical environment 100). In one example, the VSLAM application 606 includes a visual odometry system that estimates the pose of the AR device 106 and the hands of the human operator 102 based on 3D maps of feature points from images captured with the optical sensor 412 and the inertial sensor data captured with the inertial sensor 416. The VSLAM application 606 provides the AR device/hands pose information to the AR application 410 so that the AR application 410 can render virtual content at a display location that is based on the pose information. For example, the virtual object 104 appears anchored to the hands of the human operator 102.

The motion tracking system 504 provides AR device 106 pose data and the trajectory data to the robot programming by demonstration application 422. In one example, the trajectory data indicates a trajectory of the virtual object 104 relative to the physical environment 100/physical virtual object 104/or another virtual object.

Figure 7:
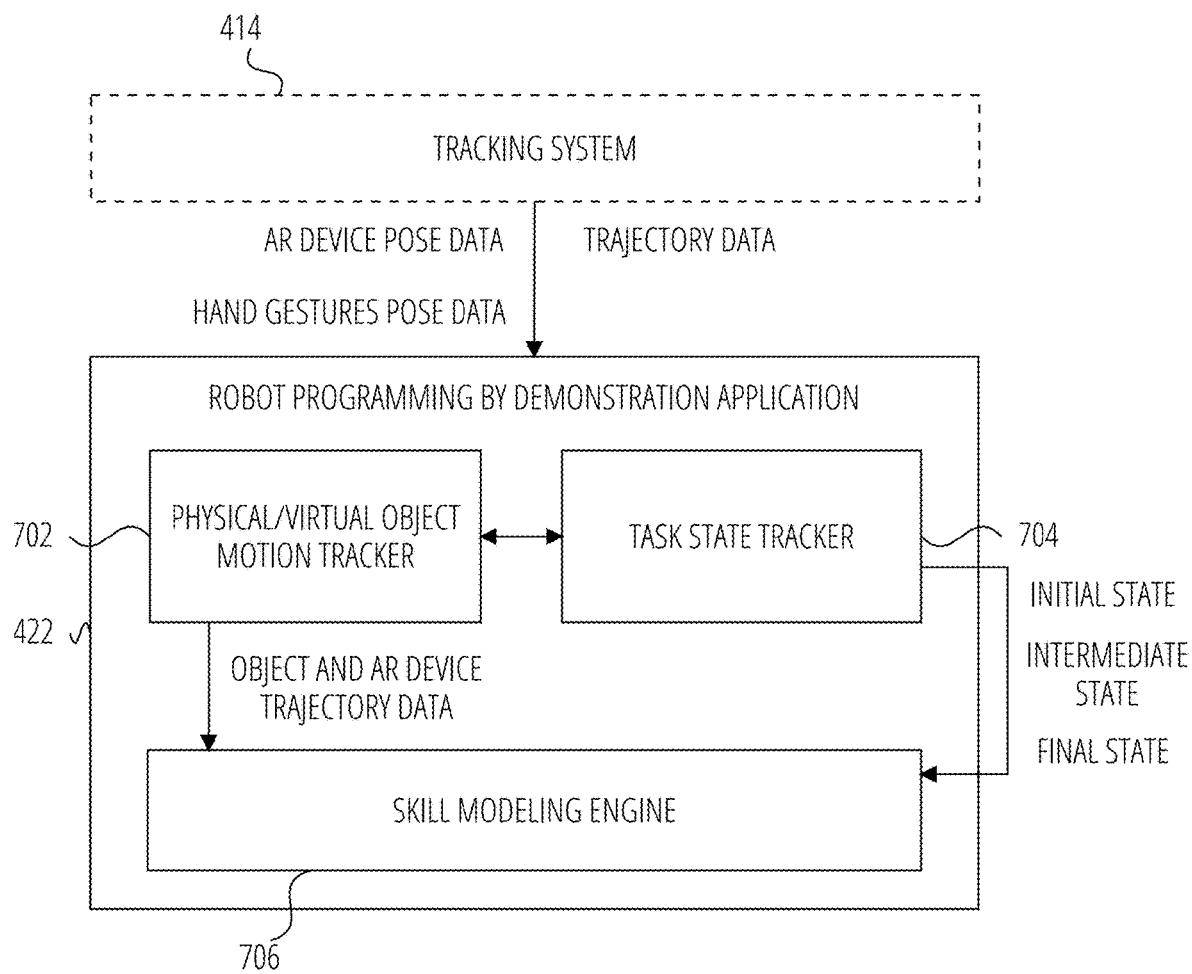
FIG. 7 is a block diagram illustrating a robot programming by demonstration application in accordance with one example embodiment.

FIG. 7 is a block diagram illustrating a robot programming by demonstration application 422 in accordance with one example embodiment. The tracking system 414 communicates with the robot programming by demonstration application 422. In one example, the tracking system 414 provides the AR device pose data, hand gestures pose data, and trajectory data to the robot programming by demonstration application 422.

The robot programming by demonstration application 422 includes a physical/virtual object motion tracker 702, a task state tracker 704, and a skill modeling engine 706. The physical/virtual object motion tracker 702 tracks a trajectory of a virtual/physical object held by the human operator 102, by tracking the pose (e.g., location, orientation) of the hands of the human operator 102 and the AR device 106 relative to the physical environment 100. The physical/virtual object motion tracker 702 uses the AR device pose data and the hands gestures pose data to generate the trajectory data.

The task state tracker 704 determines an initial state, intermediate states, and a final state of the virtual/physical object based on the trajectory data, the AR device pose data, the hand gestures pose data, and the human operator 102 requests to start or end a recording of a demonstration. The initial state indicates, for example, the initial pose of the virtual/physical object in the physical environment 100 at the start of the recording (or when the human operator 102 performs a gesture signaling a start of the demonstration). The intermediate states indicates the pose of the virtual/physical object at multiple points along a travel trajectory (e.g., 6DOF trajectory) in the physical environment 100 between the start and end of the recording. The final state indicates the final pose of the virtual/physical object in the physical environment 100 at the end of the recording (or when the human operator 102 performs a gesture signaling an end of the demonstration). In another example, the task state tracker 704 determines the initial state when the virtual object 104 is furthest from the physical object 108 and the final state when the virtual object 104 is closest to the physical object 108.

The skill modeling engine 706 generates a robot program, using PbD, based on the demonstration data provided by the physical/virtual object motion tracker 702 and the task state tracker 704. The demonstration data includes, for example, the virtual/physical object pose and trajectory, the AR device 106 pose and trajectory, the initial, intermediate, and final states of the virtual/physical object.

Figure 8:
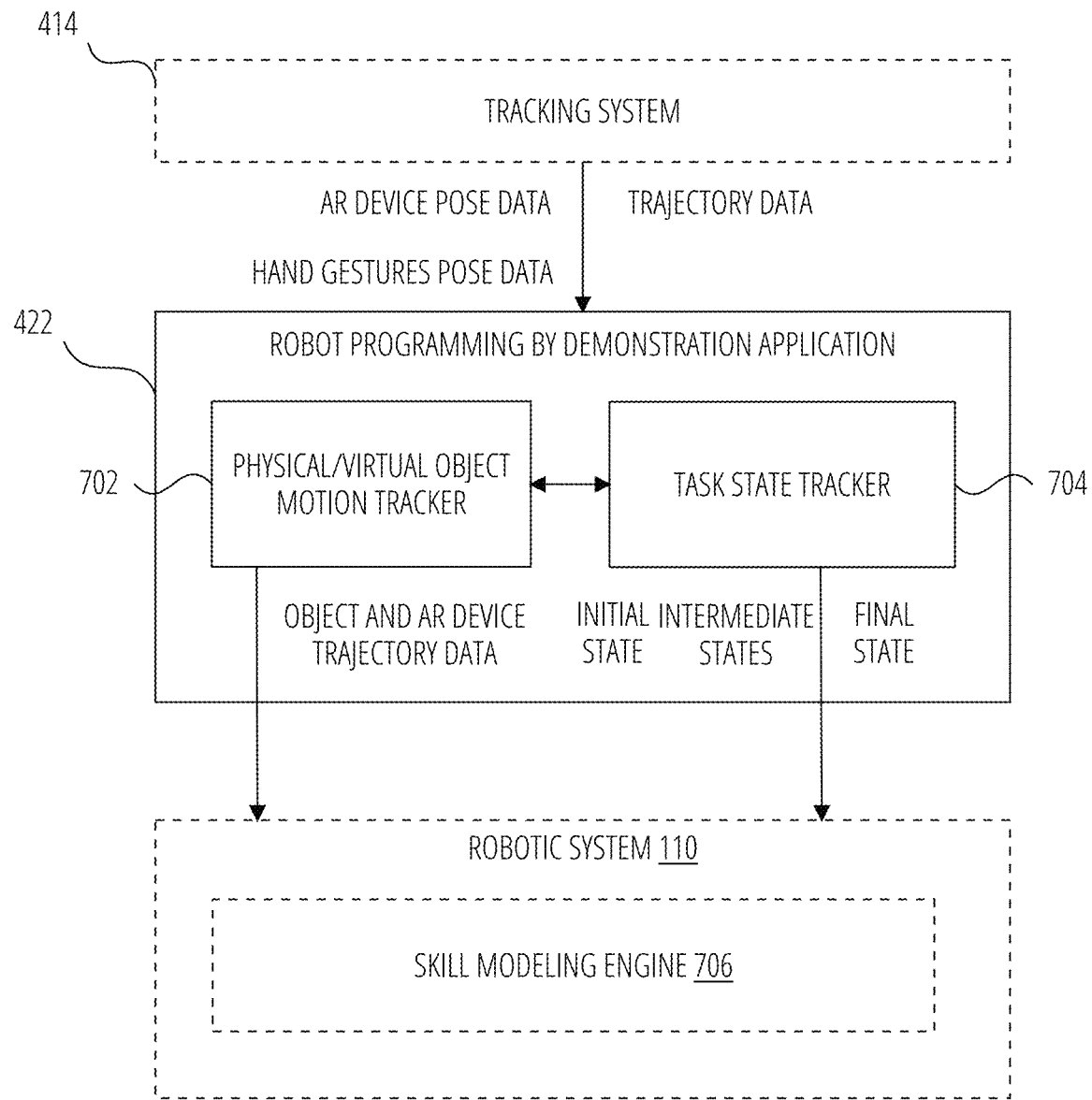
FIG. 8 is a block diagram illustrating a robot programming by demonstration application in accordance with another example embodiment.

FIG. 8 is a block diagram illustrating the robot programming by demonstration application 422 in accordance with another example embodiment. The robot programming by demonstration application 422 includes the physical/virtual object motion tracker 702, and the task state tracker 704. The physical/virtual object motion tracker 702 tracks a trajectory of a virtual/physical object held by the human operator 102, by tracking the pose (e.g., location, orientation) of the hands of the human operator 102 and the AR device 106 relative to the physical environment 100. The physical/virtual object motion tracker 702 uses the AR device pose data and the hands gestures pose data to generate the trajectory data.

The task state tracker 704 determines an initial state, intermediate states, and a final state of the virtual/physical object based on the trajectory data, the AR device pose data, the hand gestures pose data, and the human operator 102 requests to start or end a recording of a demonstration. The robot programming by demonstration application 422 provides demonstration data to the robotic system 110. The demonstration data includes, for example, the virtual/physical object pose and trajectory, the AR device 106 pose and trajectory, the initial, intermediate, and final states of the virtual/physical object. The skill modeling engine 706 is located at the robotic system 110 and generates the robot program, using PbD, based on the demonstration data provided by the robot programming by demonstration application 422.

Figure 9:
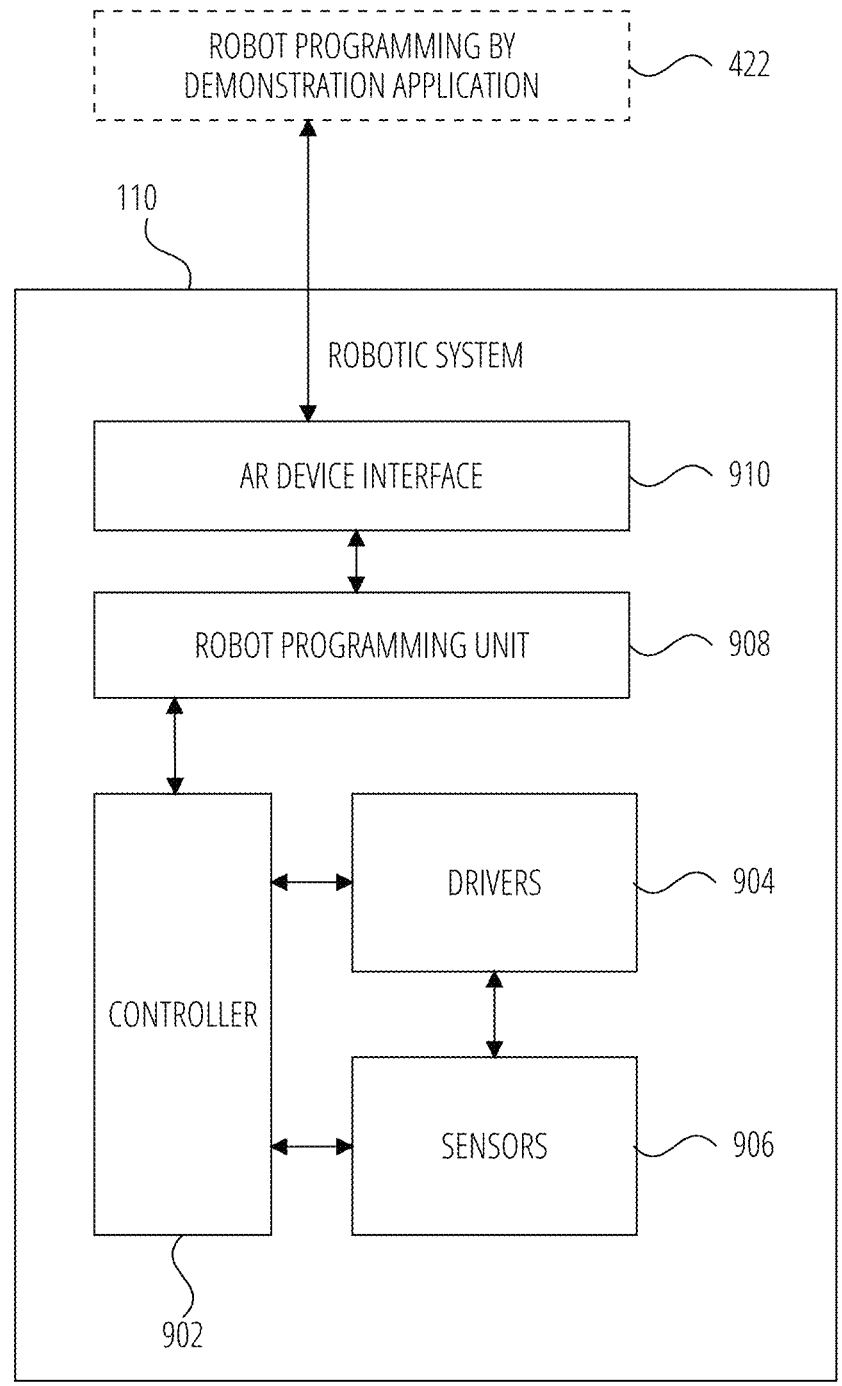
FIG. 9 is a block diagram illustrating a robotic system in accordance with one example embodiment.

FIG. 9 is a block diagram illustrating a robotic system 110 in accordance with one example embodiment. The robotic system 110 includes an AR device interface 910, robot programming unit 908, controller 902, drivers 904, and sensors 906. The AR device interface 910 is configured to communicate with the AR device 106. In one example the AR device interface 910 interfaces with the robot programming by demonstration application 422. The robot programming unit 908 is configured to execute instructions based on the program generated by the robot programming by demonstration application 422. In another example, the robot programming unit 908 generates a program, using PbD, based on the demonstration data from the robot programming by demonstration application 422. The robot programming unit 908 instructs the controller 902 to operate movable components of the robotic system 110 (e.g., arms, motors) via corresponding drivers 904. The sensors 906 collects sensor data and provides the sensor data as feedback to the controller 902.

Figure 10:
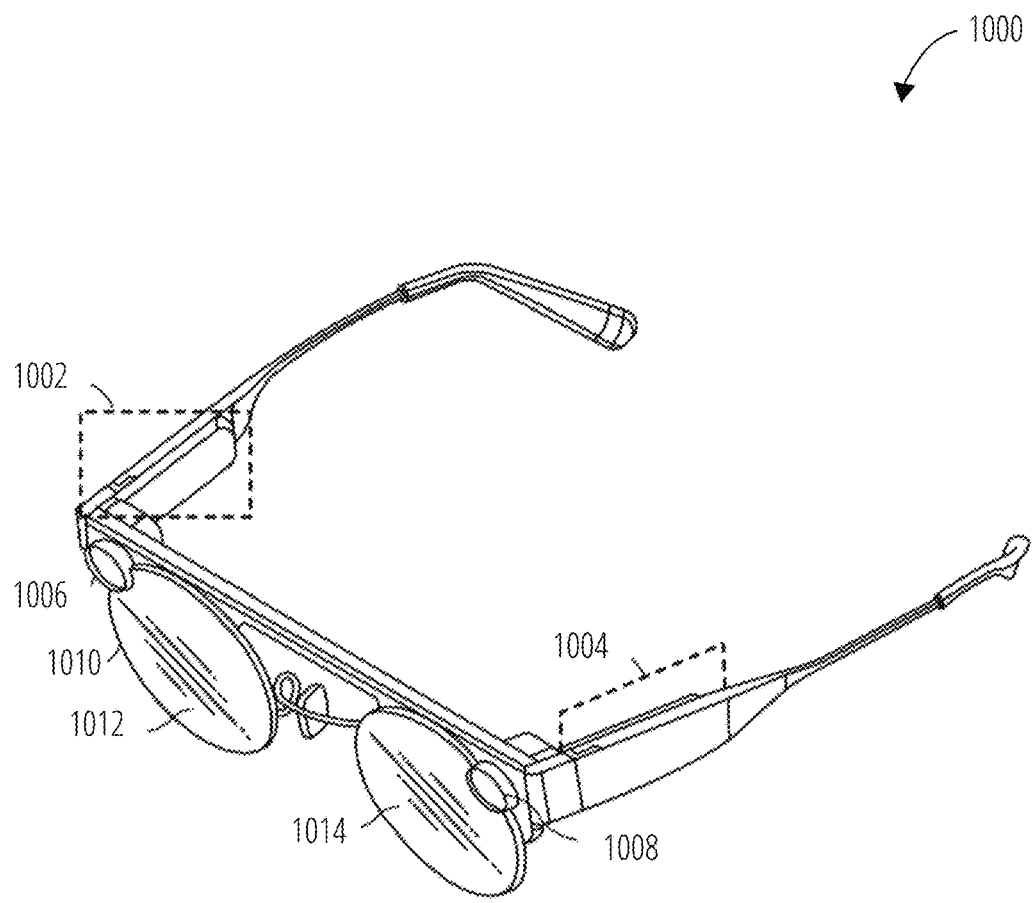
FIG. 10 illustrates an example of an AR device according to one example embodiment.

FIG. 10 illustrates a head-wearable apparatus 1000, according to one example embodiment. FIG. 10 illustrates a perspective view of the head-wearable apparatus 1000 according to one example embodiment. In some examples, the AR device 106 may be the head-wearable apparatus 1000.

In FIG. 10, the head-wearable apparatus 1000 is a pair of eyeglasses. In some embodiments, the head-wearable apparatus 1000 can be sunglasses or goggles. Some embodiments can include one or more wearable devices, such as a pendant with an integrated camera that is integrated with, in communication with, or coupled to, the head-wearable apparatus 1000 or an AR device 106. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 1000 can be included in an AR device 106 that can be used in conjunction with the head-wearable apparatus 1000.

In FIG. 10, the head-wearable apparatus 1000 is a pair of eyeglasses that includes a frame 1010 that includes eye wires (or rims) that are coupled to two stems (or temples), respectively, via hinges and/or end pieces. The eye wires of the frame 1010 carry or hold a pair of lenses (e.g., lens 1012 and lens 1014). The frame 1010 includes a first (e.g., right) side that is coupled to the first stem and a second (e.g., left) side that is coupled to the second stem. The first side is opposite the second side of the frame 1010.

The head-wearable apparatus 1000 further includes a camera module (not shown) that includes camera lenses (e.g., camera lens 1006, camera lens 1008) and at least one image sensor. The camera lens 1006 and camera lens 1008 may be a perspective camera lens or a non-perspective camera lens. A non-perspective camera lens may be, for example, a fisheye lens, a wide-angle lens, an omnidirectional lens, etc. The image sensor captures digital video through the camera lens 1006 and camera lens 1008. The images may also be still image frame or a video including a plurality of still image frames. The camera module can be coupled to the frame 1010. As shown in FIG. 10, the frame 1010 is coupled to the camera lens 1006 and camera lens 1008 such that the camera lenses (e.g., camera lens 1006, camera lens 1008) face forward. The camera lens 1006 and camera lens 1008 can be perpendicular to the lens 1012 and lens 1014. The camera module can include dual-front facing cameras that are separated by the width of the frame 1010 or the width of the head of the user of the head-wearable apparatus 1000.

In FIG. 10, the two stems (or temples) are respectively coupled to microphone housing 1002 and microphone housing 1004. The first and second stems are coupled to opposite sides of a frame 1010 of the head-wearable apparatus 1000. The first stem is coupled to the first microphone housing 1002 and the second stem is coupled to the second microphone housing 1004. The microphone housing 1002 and microphone housing 1004 can be coupled to the stems between the locations of the frame 1010 and the temple tips. The microphone housing 1002 and microphone housing 1004 can be located on either side of the user's temples when the user is wearing the head-wearable apparatus 1000.

As shown in FIG. 10, the microphone housing 1002 and microphone housing 1004 encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectro-mechanical systems (MEMS) microphones. The acoustic signals generated by the microphones can be pulse density modulation (PDM) signals.

Figure 11:
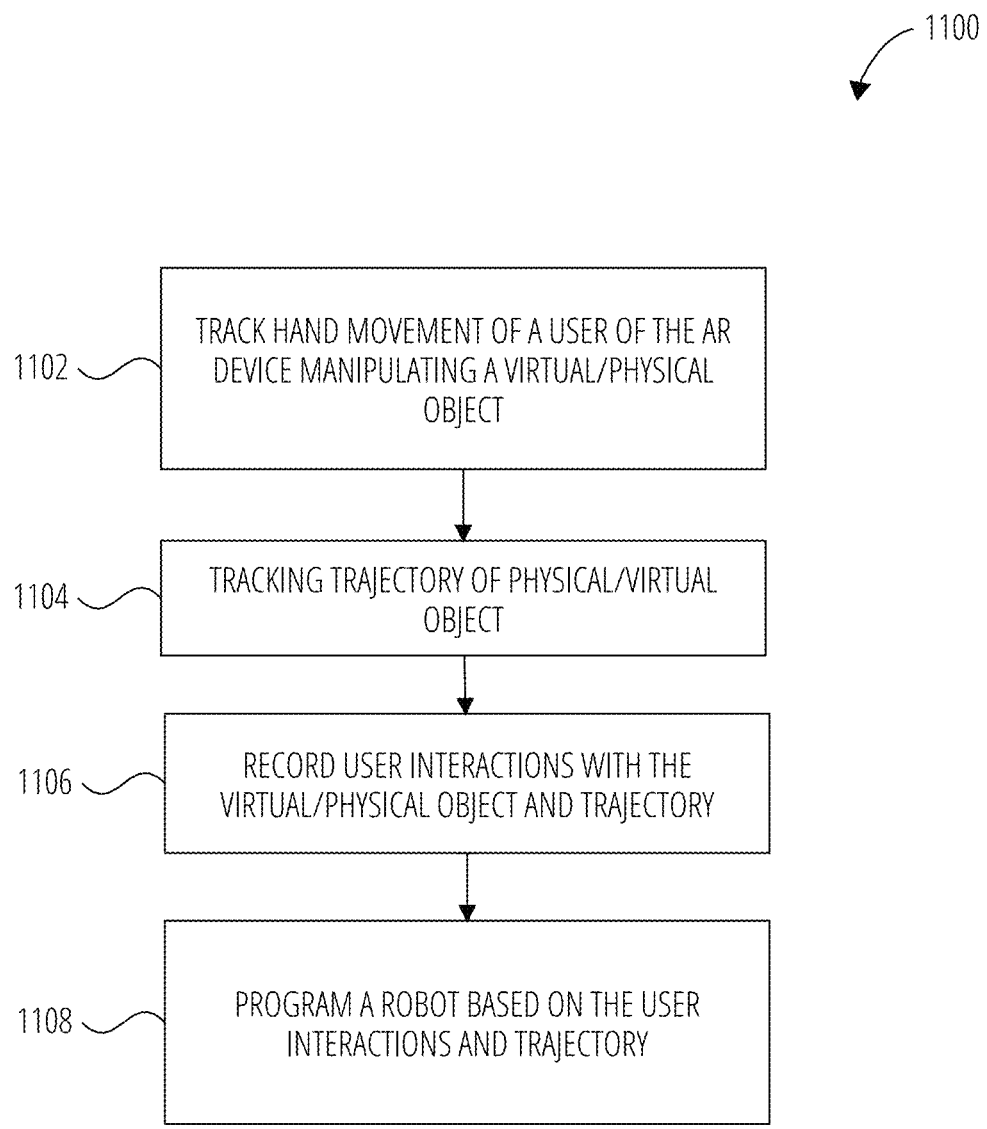
FIG. 11 is a flow diagram illustrating a method for programming a robotic system in accordance with one example embodiment.

FIG. 11 is a flow diagram illustrating a method for projecting features in accordance with another example embodiment. Operations in the method 1100 may be performed by the robot programming by demonstration application 422, using components (e.g., modules, engines) described above with respect to FIG. 7. Accordingly, the method 1100 is described by way of example with reference to the robot programming by demonstration application 422. However, it shall be appreciated that at least some of the operations of the method 1100 may be deployed on various other hardware configurations or be performed by similar Components residing elsewhere.

In block 1102, the hand gesture tracking system 506 tracks hand movement of a user of the AR device 106 manipulating a virtual/physical object. In block 1104, the tracking system 414 tracks a trajectory of the physical/virtual object. In block 1106, the physical/virtual object motion tracker 702 records user interactions with the virtual/physical object, the trajectory, and the states of the virtual/physical object. In block 1108, the skill modeling engine 706 programs the robotic system 110 based on the user interactions, trajectory, and the states of the virtual/physical object.

Figure 12:
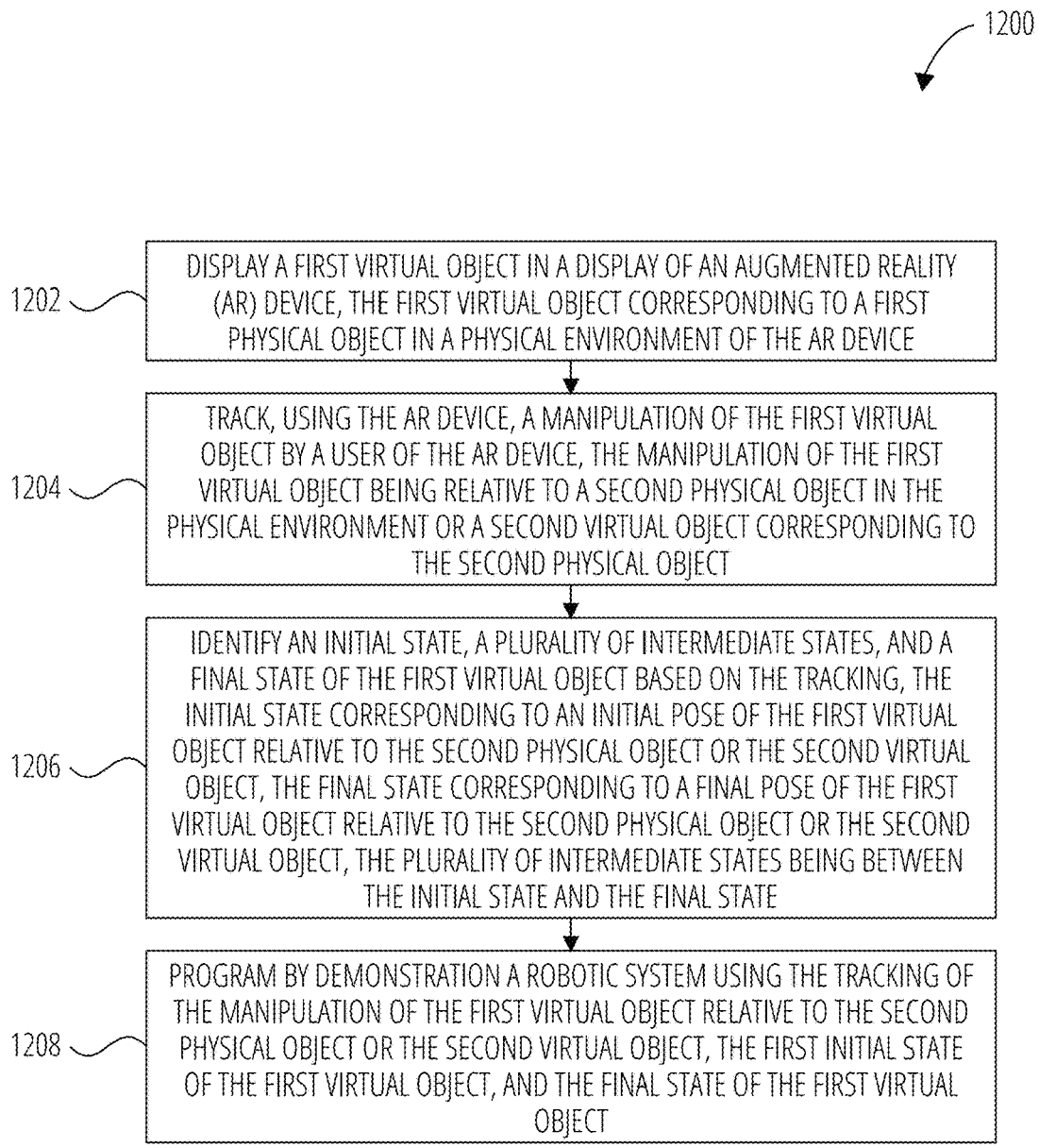
FIG. 12 is a flow diagram illustrating a method for programming a robotic system in accordance with one example embodiment.

FIG. 12 is a flow diagram illustrating a routine 1200 for programming a robotic system in accordance with one example embodiment. In block 1202, routine 1200 displays a first virtual object in a display of an augmented reality (AR) device, the first virtual object corresponding to a first physical object in a physical environment of the AR device. In block 1204, routine 1200 tracks, using the AR device, a manipulation of the first virtual object by a user of the AR device, the manipulation of the first virtual object being relative to a second physical object in the physical environment or a second virtual object corresponding to the second physical object. In block 1206, routine 1200 identifies an initial state, a plurality of intermediate states, and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, the plurality of intermediate states being between the initial state and the final state. In block 1208, routine 1200 programs by demonstration a robotic system using the tracking of the manipulation of the first virtual object relative to the second physical object or the second virtual object, the first initial state of the first virtual object, and the final state of the first virtual object.

Figure 13:
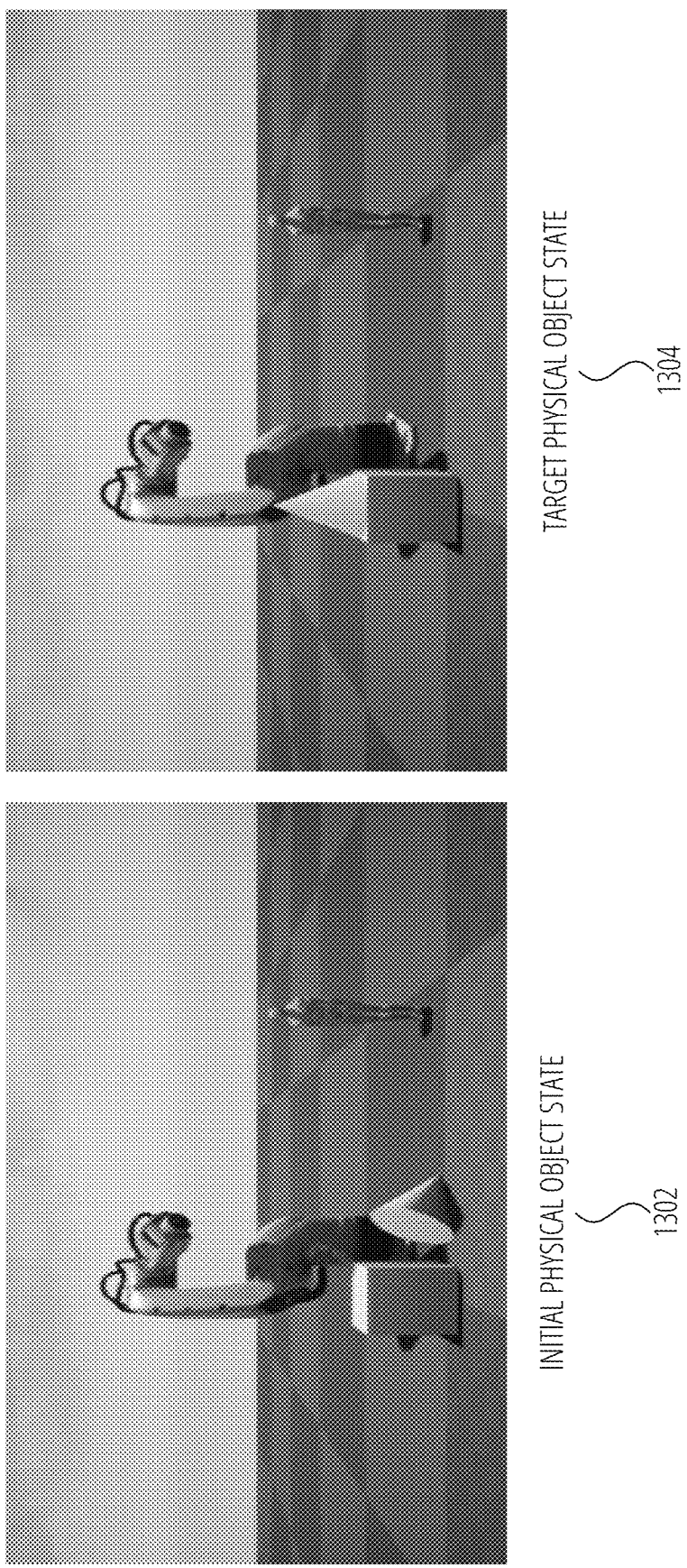
FIG. 13 illustrates an initial state and a target state in accordance with one example embodiment.

FIG. 13 illustrates an initial state and a target state in accordance with one example embodiment. In the initial physical object state 1302, a first physical object has a first pose and is at a first location. In the target physical object state 1304, the first physical object has a second pose and is at a second location.

Figure 14:
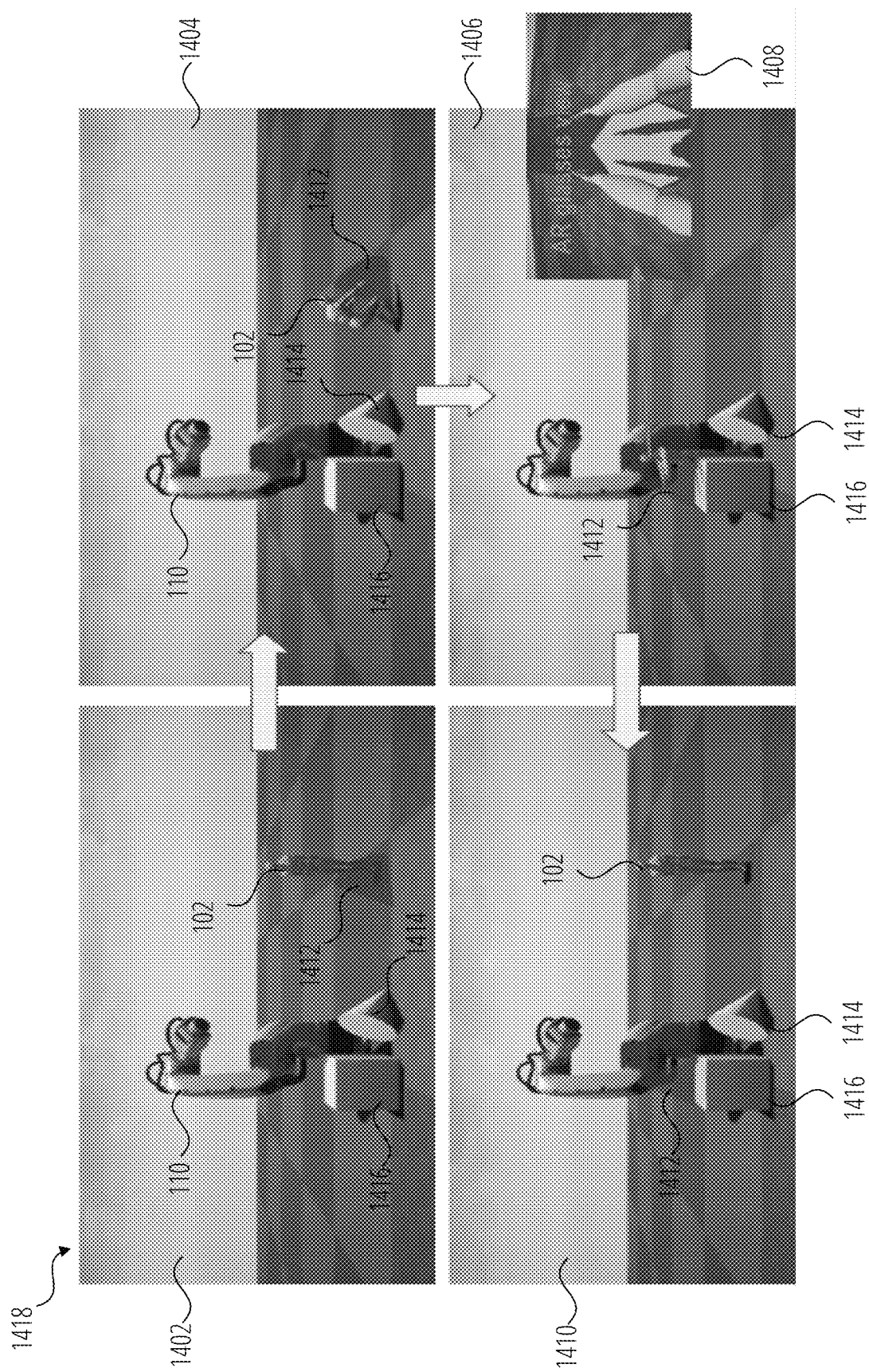
FIG. 14 illustrates a sequence of programming by demonstration with the AR device in accordance with one example embodiment.

FIG. 14 illustrates a sequence of programming by demonstration (demonstration sequence 1418) with the AR device 106 in accordance with one example embodiment. A programming sequence 1402 illustrates an initial state wherein a first virtual object 1412 represents a first physical object 1414 is rendered at the AR device 106. In programming sequence 1404, the human operator 102 manipulates the first virtual object 1412. In programming sequence 1406, the human operator 102 places the first virtual object 1412 on the second physical object 1416. The AR device perspective 1408 illustrates a perspective from the human operator 102. The programming sequence 1410 illustrates a final state where the first virtual object 1412 is placed on top of the second physical object 1416.

Figure 15:
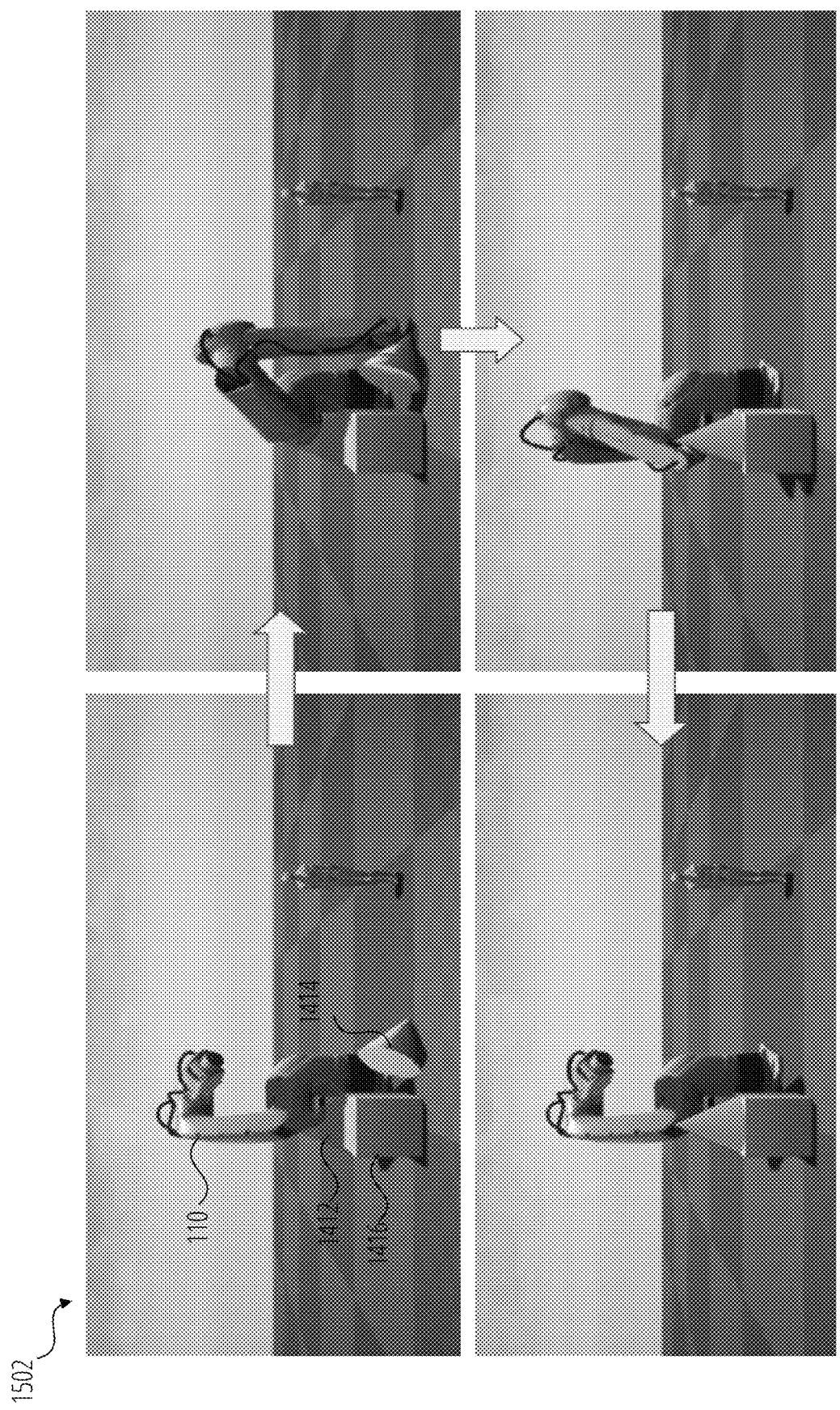
FIG. 15 illustrates a robotic system executing the programming sequence of FIG. 14 in accordance with one example embodiment.

FIG. 15 illustrates a robotic system executing the programming sequence of FIG. 14 in accordance with one example embodiment. The reproduction sequence 1502 illustrates the robotic system 110 reproducing the manipulation demonstrated in FIG. 14 on the first virtual object 1412.

Figure 16:
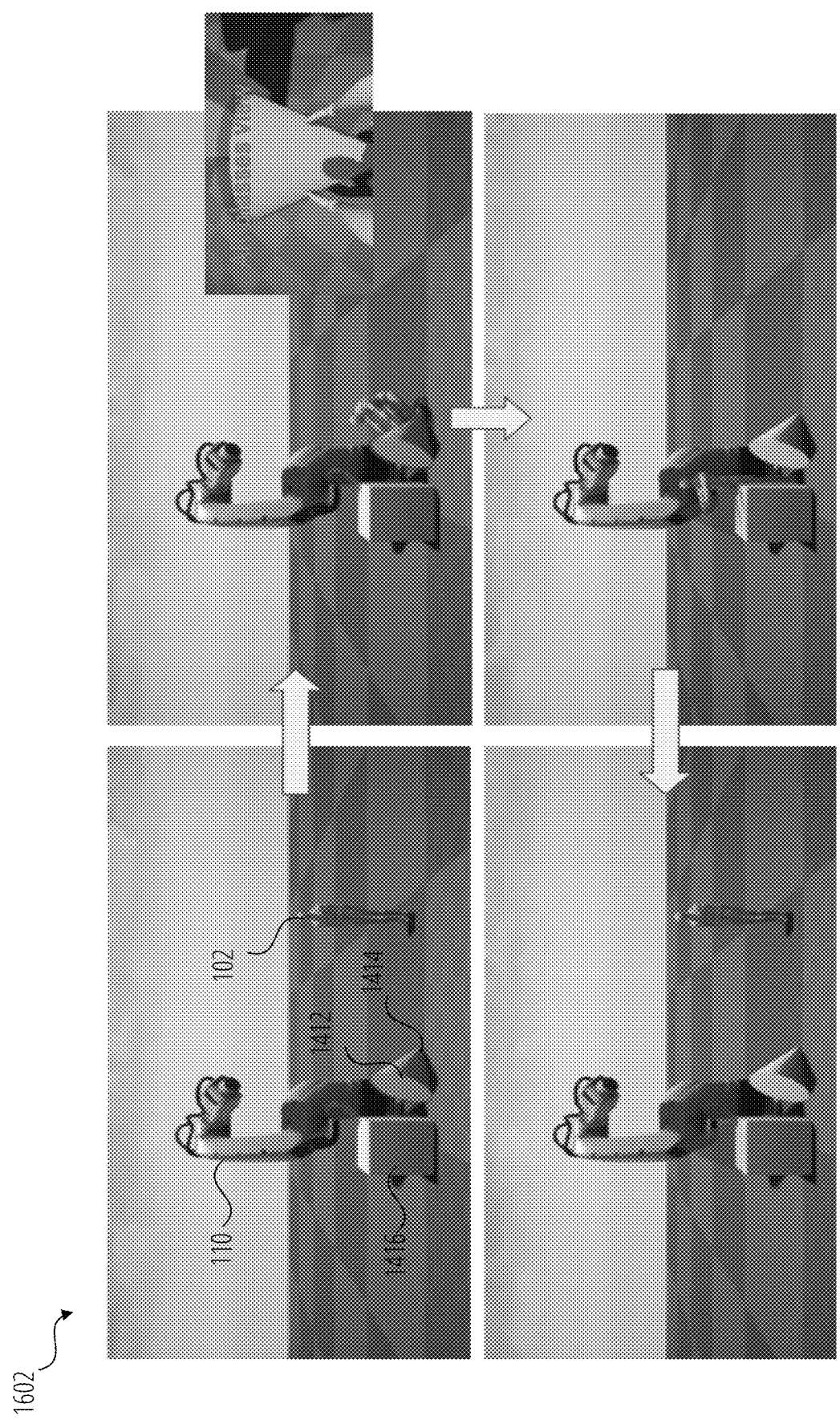
FIG. 16 illustrates a sequence of programming by demonstration with the AR device in accordance with one example embodiment.

FIG. 16 illustrates a sequence of programming by demonstration with the AR device in accordance with one example embodiment. The demonstration sequence 1602 is similar to the programming sequence of FIG. 14 except that the first virtual object 1412 is rendered at a pose of the first physical object 1414. The human operator 102 picks up the first virtual object 1412 instead of the first physical object 1414.

Figure 17:
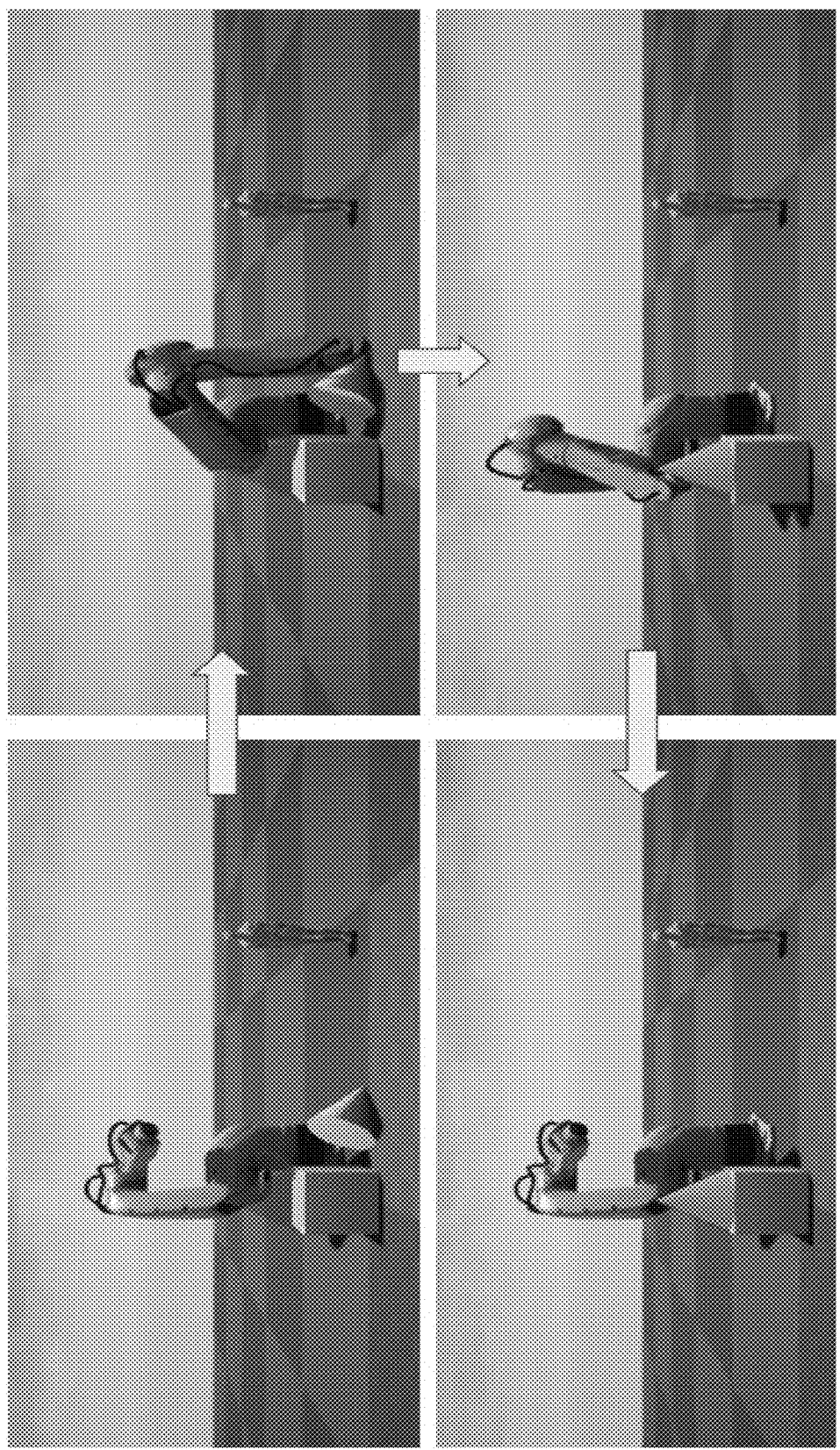
FIG. 17 illustrates a robotic system executing the programming sequence of FIG. 16 in accordance with one example embodiment.

FIG. 17 illustrates a robotic system executing the programming sequence of FIG. 16 in accordance with one example embodiment. The reproduction sequence 1702 illustrates the robotic system 110 reproducing the manipulation demonstrated in FIG. 16 on the first virtual object 1412.

Figure 18:
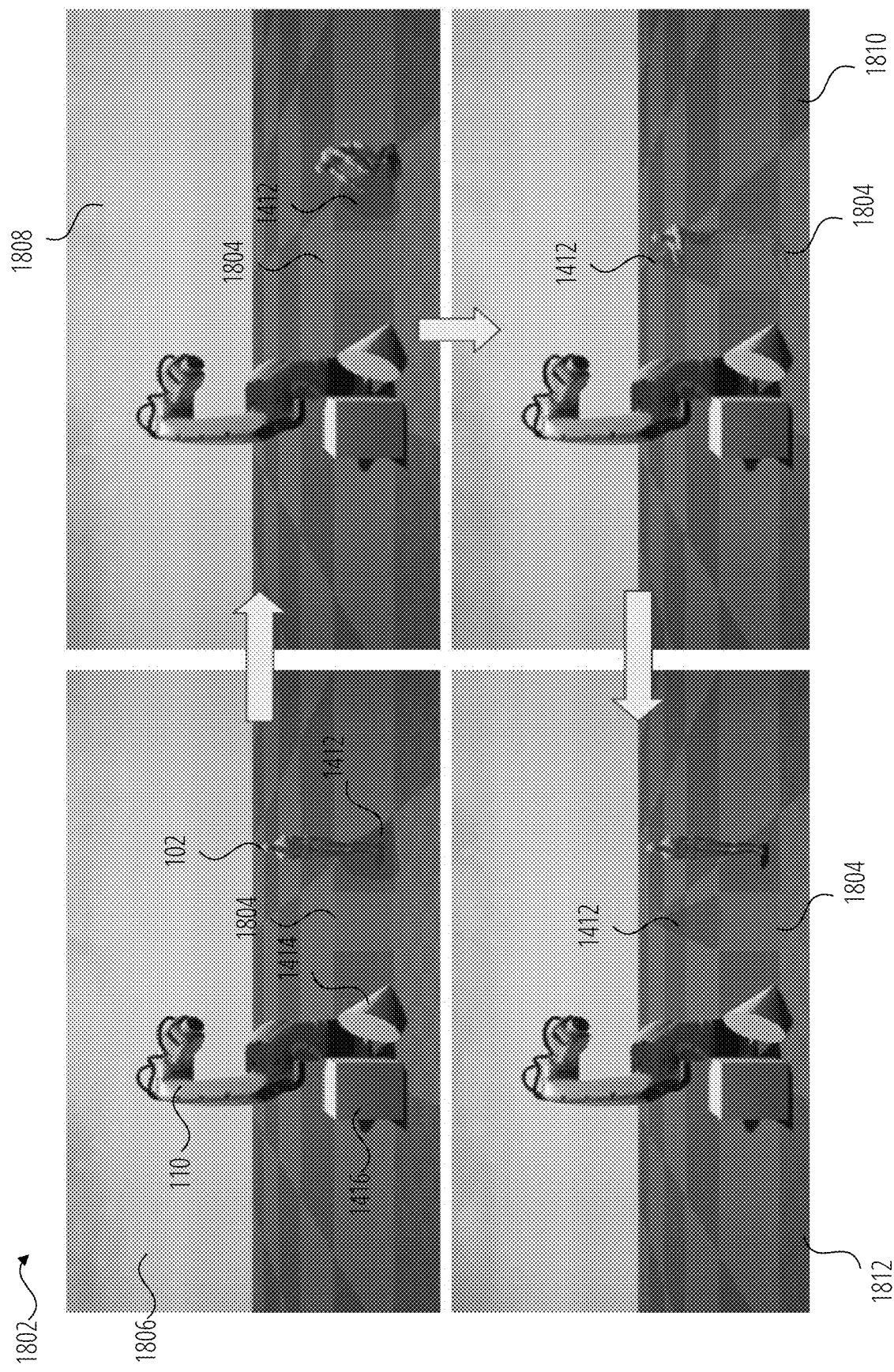
FIG. 18 illustrates a sequence of programming by demonstration with the AR device in accordance with one example embodiment.

FIG. 18 illustrates a sequence of programming by demonstration (demonstration sequence 1802) with the AR device 106 in accordance with one example embodiment. A sequence 1806 illustrates an initial state where the first virtual object 1412 represents the first physical object 1414 and the second virtual object 1804 represents the second physical object 1416. The first virtual object 1412 and the second virtual object 1804 are rendered in the AR device 106 to appear as part of the physical environment 100. In sequence 1808, the human operator 102 manipulates the first virtual object 1412. In sequence 1810, the human operator 102 places the first virtual object 1412 on the second virtual object 1804. The sequence 1812 illustrates a final state where the first virtual object 1412 is placed on top of the second virtual object 1804.

Figure 19:
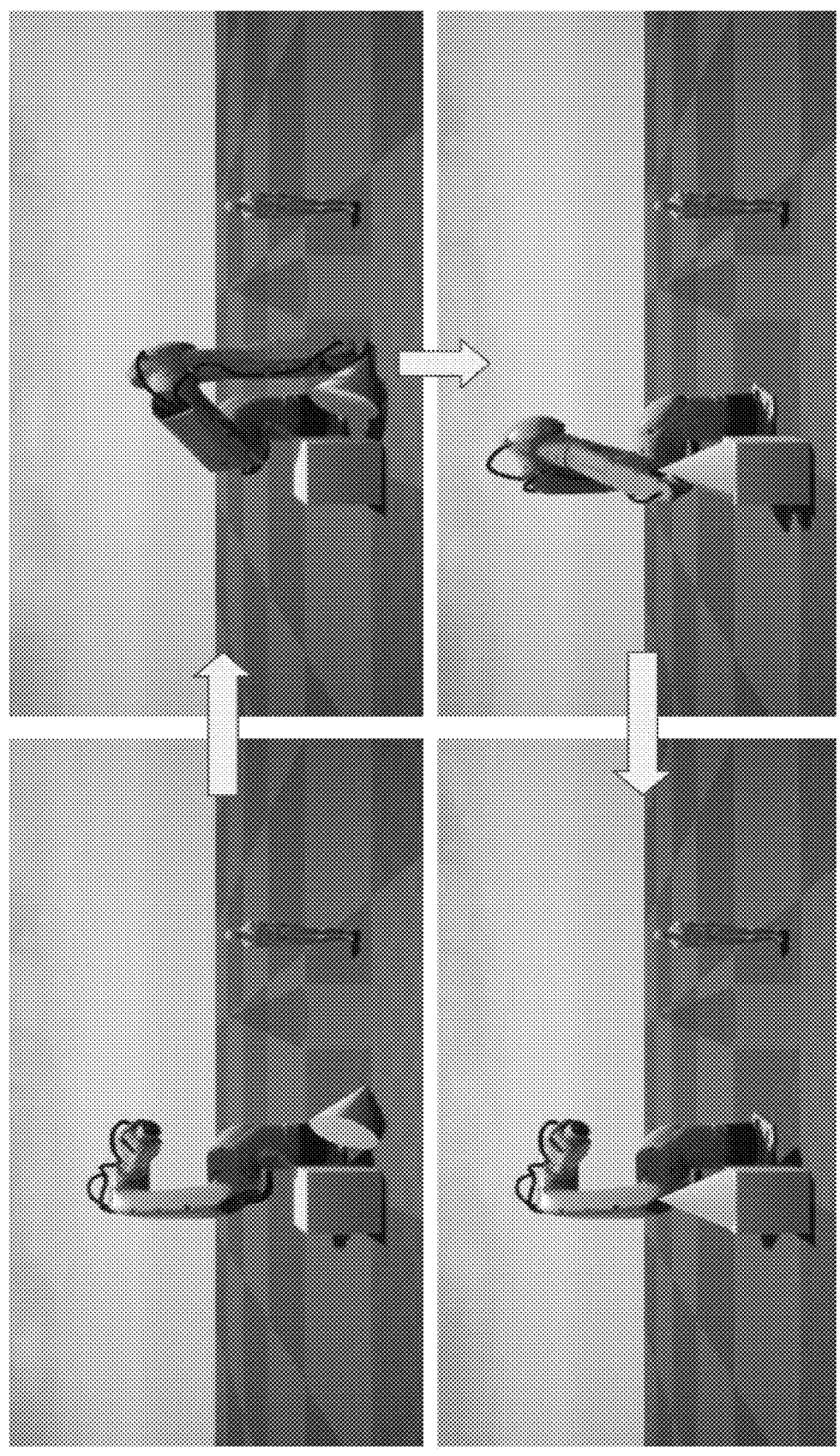
FIG. 19 illustrates a robotic system executing the programming sequence of FIG. 18 in accordance with one example embodiment.

FIG. 19 illustrates a robotic system executing the programming sequence (demonstration sequence 1802) of FIG. 18 in accordance with one example embodiment. The reproduction sequence 1902 illustrates the robotic system 110 reproducing the manipulation demonstrated in FIG. 18 on the first virtual object 1412.

Figure 20:
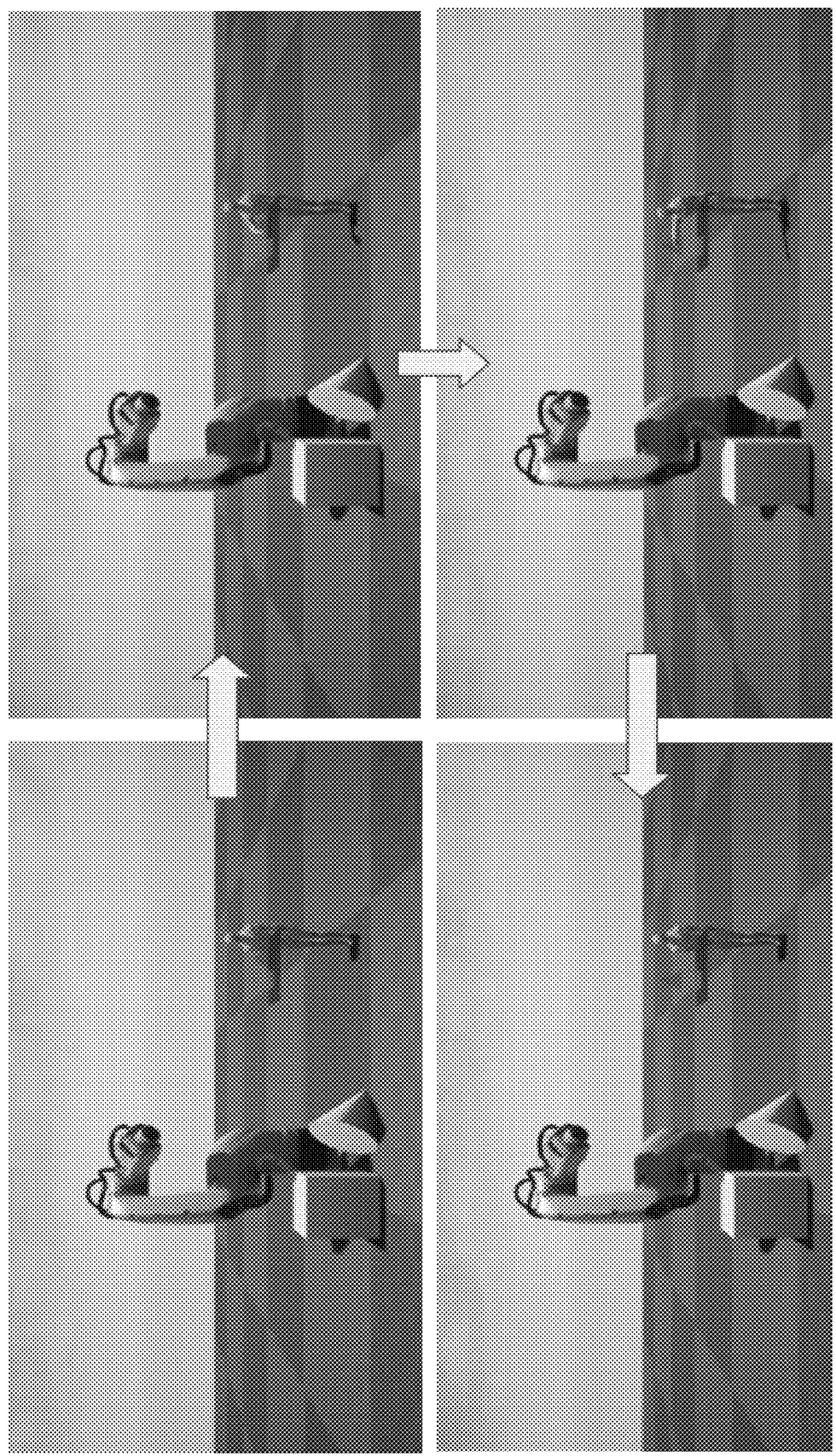
FIG. 20 illustrates a sequence of programming by demonstration with the AR device in accordance with one example embodiment.

FIG. 20 illustrates a sequence of programming by demonstration (demonstration sequence 2002) with the AR device 106 in accordance with one example embodiment. The demonstration sequence 2002 is similar to the programming sequence of FIG. 18 except that the first virtual object 1412 and the second virtual object 1804 are rendered at a smaller scale. The human operator 102 manipulates the scaled down version of the first virtual object 1412 instead of the life size version of the first virtual object 1412.

Figure 21:
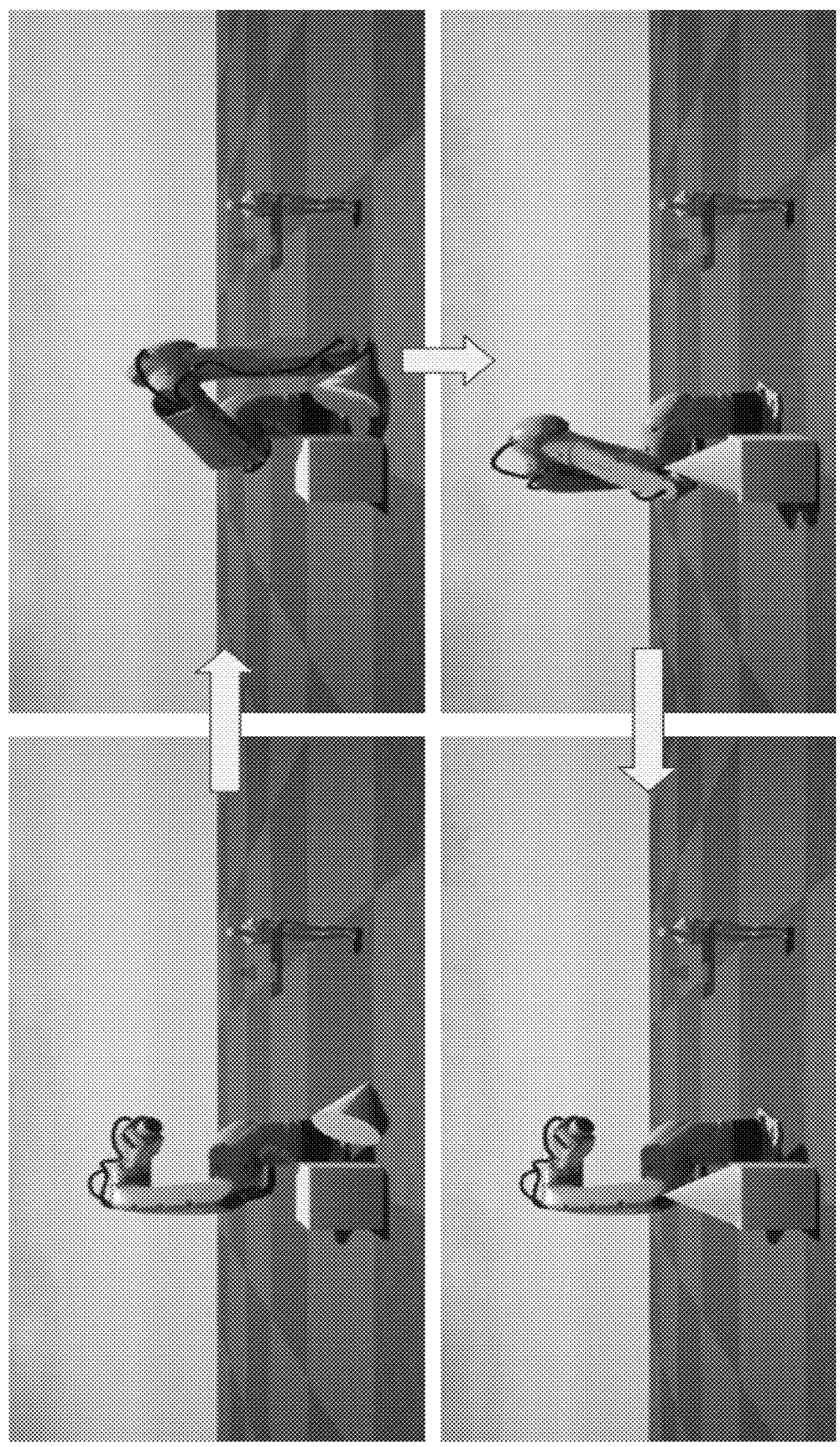
FIG. 21 illustrates a robotic system executing the programming sequence of FIG. 20 in accordance with one example embodiment.

FIG. 21 illustrates a robotic system executing the programming sequence (demonstration sequence 2002) of FIG. 20 in accordance with one example embodiment. The reproduction sequence 2102 illustrates the robotic system 110 reproducing the manipulation demonstrated in FIG. 20 on scaled down version of the first virtual object 1412.

System with Head-Wearable Apparatus

Figure 22:
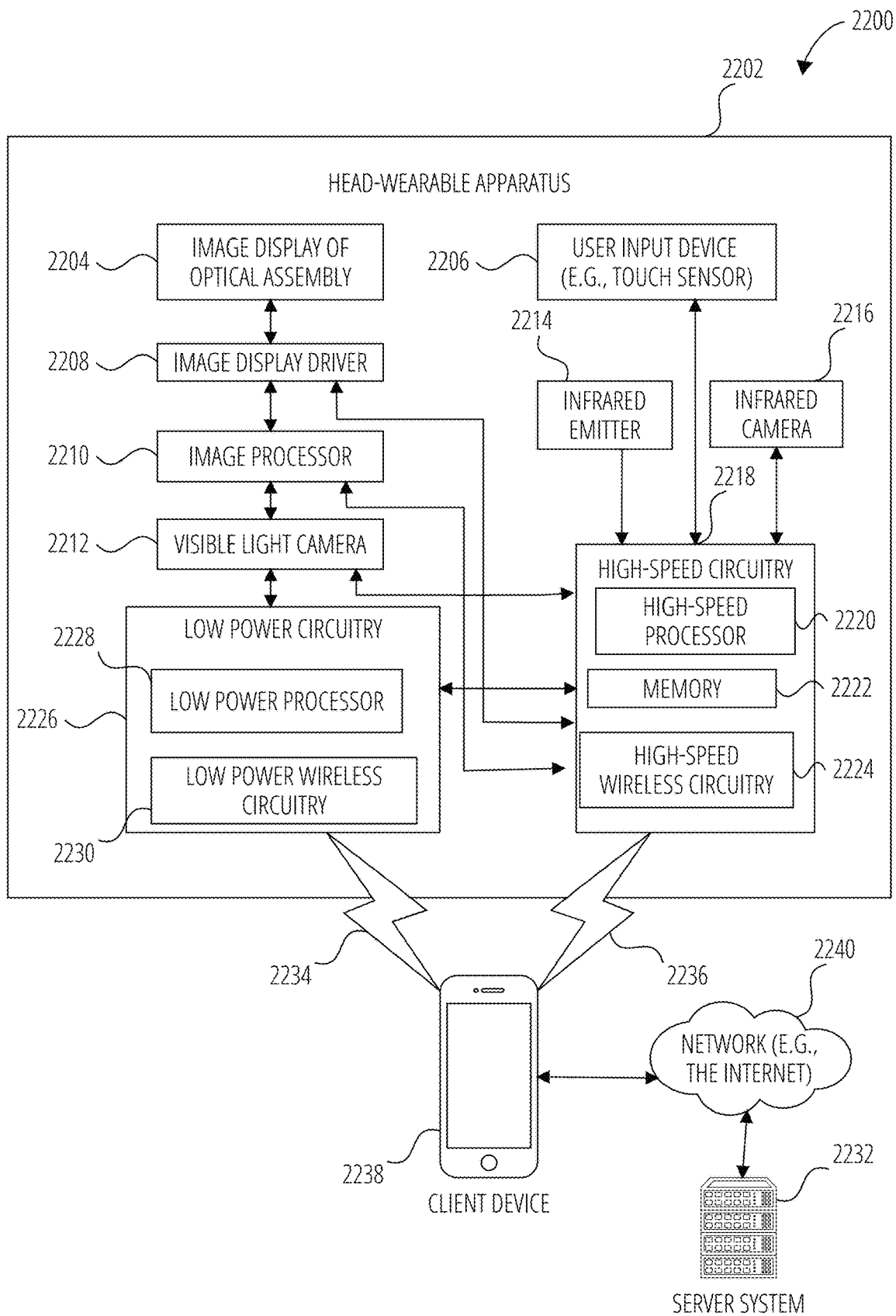
FIG. 22 illustrates a network environment in which a head-wearable device can be implemented according to one example embodiment.

FIG. 22 illustrates a network environment 2200 in which the head-wearable apparatus 2202 can be implemented according to one example embodiment. FIG. 22 is a high-level functional block diagram of an example head-wearable apparatus 2202 communicatively coupled a mobile client device 2238 and a server system 2232 via various network 2240. [0099] head-wearable apparatus 2202 includes a camera, such as at least one of visible light camera 2212, infrared emitter 2214 and infrared camera 2216. The client device 2238 can be capable of connecting with head-wearable apparatus 2202 using both a communication 2234 and a communication 2236. client device 2238 is connected to server system 2232 and network 2240. The network 2240 may include any combination of wired and wireless connections.

The head-wearable apparatus 2202 further includes two image displays of the image display of optical assembly 2204. The two include one associated with the left lateral side and one associated with the right lateral side of the head-wearable apparatus 2202. The head-wearable apparatus 2202 also includes image display driver 2208, image processor 2210, low-power low power circuitry 2226, and high-speed circuitry 2218. The image display of optical assembly 2204 are for presenting images and videos, including an image that can include a graphical user interface to a user of the head-wearable apparatus 2202.

The image display driver 2208 commands and controls the image display of the image display of optical assembly 2204. The image display driver 2208 may deliver image data directly to the image display of the image display of optical assembly 2204 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 2202 includes a frame and stems (or temples) extending from a lateral side of the frame. The head-wearable apparatus 2202 further includes a user input device 2206 (e.g., touch sensor or push button) including an input surface on the head-wearable apparatus 2202. The user input device 2206 (e.g., touch sensor or push button) is to receive from the user an input selection to manipulate the graphical user interface of the presented image.

The components shown in FIG. 22 for the head-wearable apparatus 2202 are located on one or more circuit boards, for example a PCB or flexible PCB, in the rims or temples. Alternatively, or additionally, the depicted components can be located in the chunks, frames, hinges, or bridge of the head-wearable apparatus 2202. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 2202 includes a memory 2222 which stores instructions to perform a subset or all of the functions described herein. memory 2222 can also include storage device.

As shown in FIG. 22, high-speed circuitry 2218 includes high-speed processor 2220, memory 2222, and high-speed wireless circuitry 2224. In the example, the image display driver 2208 is coupled to the high-speed circuitry 2218 and operated by the high-speed processor 2220 in order to drive the left and right image displays of the image display of optical assembly 2204. high-speed processor 2220 may be any processor capable of managing high-speed communications and operation of any general computing system needed for head-wearable apparatus 2202. The high-speed processor 2220 includes processing resources needed for managing high-speed data transfers on communication 2236 to a wireless local area network (WLAN) using high-speed wireless circuitry 2224. In certain examples, the high-speed processor 2220 executes an operating system such as a LINUX operating system or other such operating system of the head-wearable apparatus 2202 and the operating system is stored in memory 2222 for execution. In addition to any other responsibilities, the high-speed processor 2220 executing a software architecture for the head-wearable apparatus 2202 is used to manage data transfers with high-speed wireless circuitry 2224. In certain examples, high-speed wireless circuitry 2224 is configured to implement Institute of Electrical and Electronic Engineers (IEEE) 2202.11 communication standards, also referred to herein as Wi-Fi. In other examples, other high-speed communications standards may be implemented by high-speed wireless circuitry 2224.

The low power wireless circuitry 2230 and the high-speed wireless circuitry 2224 of the head-wearable apparatus 2202 can include short range transceivers (Bluetooth™) and wireless wide, local, or wide area network transceivers (e.g., cellular or WiFi). The client device 2238, including the transceivers communicating via the communication 2234 and communication 2236, may be implemented using details of the architecture of the head-wearable apparatus 2202, as can other elements of network 2240.

The memory 2222 includes any storage device capable of storing various data and applications, including, among other things, camera data generated by the left and right, infrared camera 2216, and the image processor 2210, as well as images generated for display by the image display driver 2208 on the image displays of the image display of optical assembly 2204. While memory 2222 is shown as integrated with high-speed circuitry 2218, in other examples, memory 2222 may be an independent standalone element of the head-wearable apparatus 2202. In certain such examples, electrical routing lines may provide a connection through a chip that includes the high-speed processor 2220 from the image processor 2210 or low power processor 2228 to the memory 2222. In other examples, the high-speed processor 2220 may manage addressing of memory 2222 such that the low power processor 2228 will boot the high-speed processor 2220 any time that a read or write operation involving memory 2222 is needed.

As shown in FIG. 22, the low power processor 2228 or high-speed processor 2220 of the head-wearable apparatus 2202 can be coupled to the camera (visible light camera 2212; infrared emitter 2214, or infrared camera 2216), the image display driver 2208, the user input device 2206 (e.g., touch sensor or push button), and the memory 2222.

The head-wearable apparatus 2202 is connected with a host computer. For example, the head-wearable apparatus 2202 is paired with the client device 2238 via the communication 2236 or connected to the server system 2232 via the network 2240. server system 2232 may be one or more computing devices as part of a service or network computing system, for example, that include a processor, a memory, and network communication interface to communicate over the network 2240 with the client device 2238 and head-wearable apparatus 2202.

The client device 2238 includes a processor and a network communication interface coupled to the processor. The network communication interface allows for communication over the network 2240, communication 2234 or communication 2236. client device 2238 can further store at least portions of the instructions for generating a binaural audio content in the client device 2238's memory to implement the functionality described herein.

Output components of the head-wearable apparatus 2202 include visual components, such as a display such as a liquid crystal display (LCD), a plasma display panel (PDP), a light emitting diode (LED) display, a projector, or a waveguide. The image displays of the optical assembly are driven by the image display driver 2208. The output components of the head-wearable apparatus 2202 further include acoustic components (e.g., speakers), haptic components (e.g., a vibratory motor), other signal generators, and so forth. The input components of the head-wearable apparatus 2202, the client device 2238, and server system 2232, such as the user input device 2206, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 2202 may optionally include additional peripheral device elements. Such peripheral device elements may include biometric sensors, additional sensors, or display elements integrated with head-wearable apparatus 2202. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 2236 from the client device 2238 via the low power wireless circuitry 2230 or high-speed wireless circuitry 2224.

Figure 23:
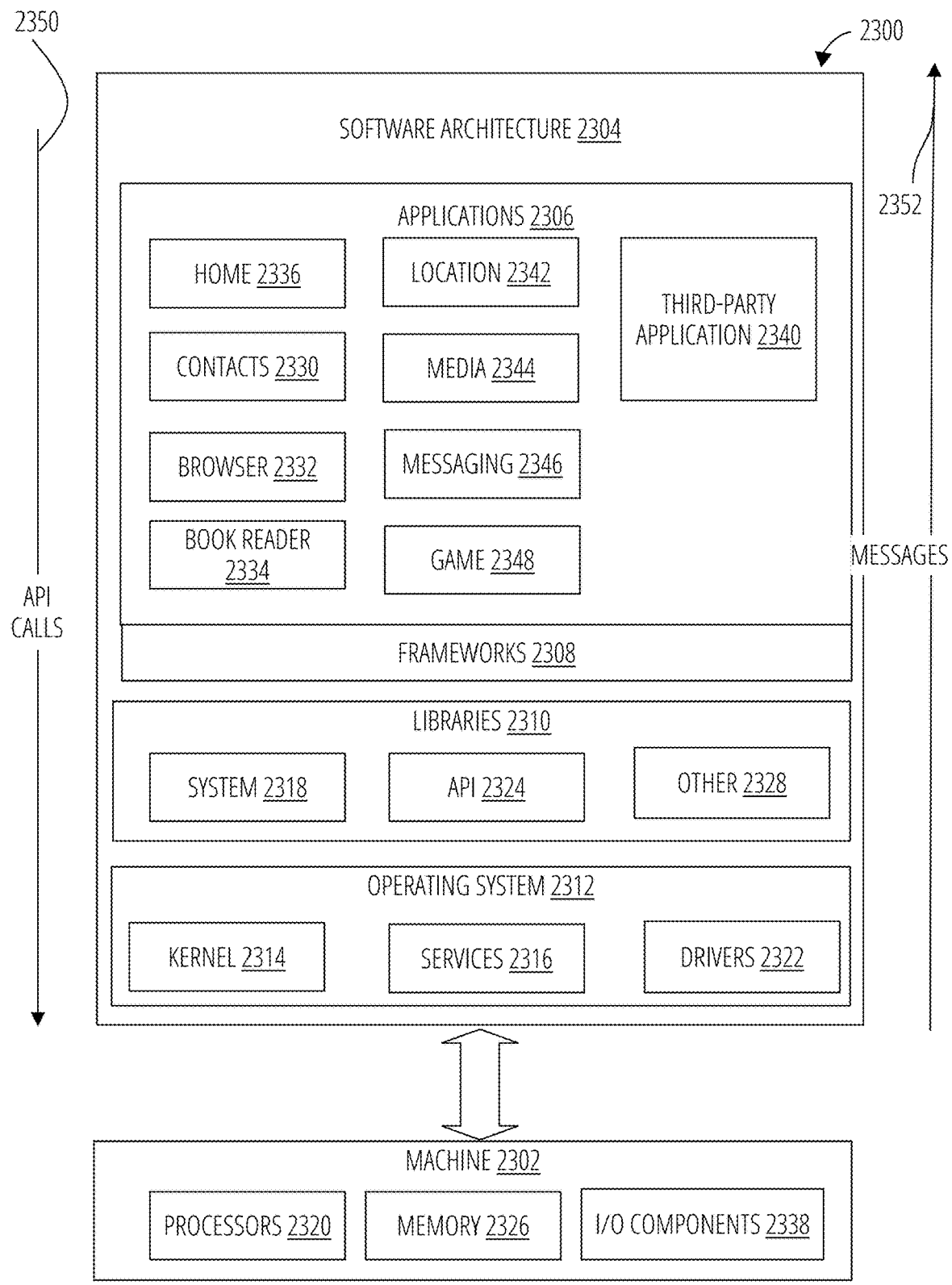
FIG. 23 is a block diagram showing a software architecture within which the present disclosure may be implemented, according to an example embodiment.

FIG. 23 is block diagram 2300 showing a software architecture within which the present disclosure may be implemented, according to an example embodiment.

The software architecture 2304 is supported by hardware such as a machine 2302 that includes Processors 2320, memory 2326, and I/O Components 2338. In this example, the software architecture 2304 can be conceptualized as a stack of layers, where each layer provides a particular functionality. The software architecture 2304 includes layers such as an operating system 2312, libraries 2310, frameworks 2308, and applications 2306. Operationally, the applications 2306 invoke API calls 2350 through the software stack and receive messages 2352 in response to the API calls 2350.

The operating system 2312 manages hardware resources and provides common services. The operating system 2312 includes, for example, a kernel 2314, services 2316, and drivers 2322. The kernel 2314 acts as an abstraction layer between the hardware and the other software layers. For example, the kernel 2314 provides memory management, Processor management (e.g., scheduling), Component management, networking, and security settings, among other functionalities. The services 2316 can provide other common services for the other software layers. The drivers 2322 are responsible for controlling or interfacing with the underlying hardware. For instance, the drivers 2322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 2310 provide a low-level common infrastructure used by the applications 2306. The libraries 2310 can include system libraries 2318 (e.g., C standard library) that provide functions such as memory allocation functions, string manipulation functions, mathematic functions, and the like. In addition, the libraries 2310 can include API libraries 2324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2310 can also include a wide variety of other libraries 2328 to provide many other APIs to the applications 2306.

The frameworks 2308 provide a high-level common infrastructure that is used by the applications 2306. For example, the frameworks 2308 provide various graphical user interface (GUI) functions, high-level resource management, and high-level location services. The frameworks 2308 can provide a broad spectrum of other APIs that can be used by the applications 2306, some of which may be specific to a particular operating system or platform.

In an example embodiment, the applications 2306 may include a home application 2336, a contacts application 2330, a browser application 2332, a book reader application 2334, a location application 2342, a media application 2344, a messaging application 2346, a game application 2348, and a broad assortment of other applications such as a third-party application 2340. The applications 2306 are programs that execute functions defined in the programs. Various programming languages can be employed to create one or more of the applications 2306, structured in a variety of manners, such as object-oriented programming languages (e.g., Objective-C, Java, or C++) or procedural programming languages (e.g., C or assembly language). In a specific example, the third-party application 2340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2340 can invoke the API calls 2350 provided by the operating system 2312 to facilitate functionality described herein.

Figure 24:
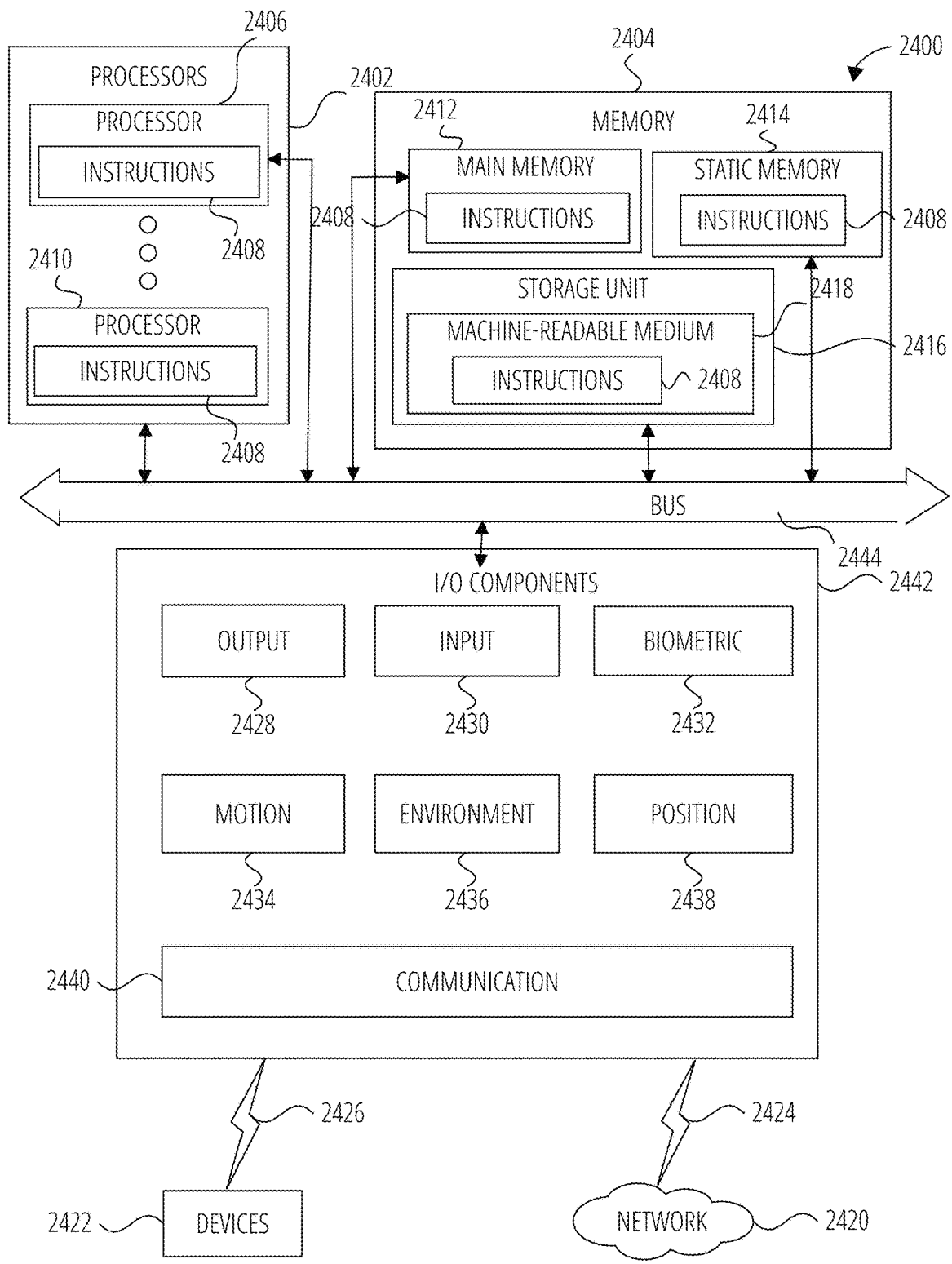
FIG. 24 is a diagrammatic representation of a machine in the form of a computer system within which a set of instructions may be executed for causing the machine to perform any one or more of the methodologies discussed herein, according to one example embodiment.

FIG. 24 is a diagrammatic representation of the machine 2400 within which instructions 2408 (e.g., software, a program, an application, an applet, an app, or other executable code) for causing the machine 2400 to perform any one or more of the methodologies discussed herein may be executed. For example, the instructions 2408 may cause the machine 2400 to execute any one or more of the methods described herein. The instructions 2408 transform the general, non-programmed machine 2400 into a particular machine 2400 programmed to carry out the described and illustrated functions in the manner described. The machine 2400 may operate as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2408, sequentially or otherwise, that specify actions to be taken by the machine 2400. Further, while only a single machine 2400 is illustrated, the term "machine" shall also be taken to include a collection of machines that individually or jointly execute the instructions 2408 to perform any one or more of the methodologies discussed herein.

The machine 2400 may include Processors 2402, memory 2404, and I/O Components 2442, which may be configured to communicate with each other via a bus 2444. In an example embodiment, the Processors 2402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 2406 and a Processor 2410 that execute the instructions 2408. The term "Processor" is intended to include multi-core Processors that may comprise two or more independent Processors (sometimes referred to as "cores") that may execute instructions contemporaneously.

Although FIG. 24 shows multiple Processors 2402, the machine 2400 may include a single Processor with a single core, a single Processor with multiple cores (e.g., a multi-core Processor), multiple Processors with a single core, multiple Processors with multiples cores, or any combination thereof.

The memory 2404 includes a main memory 2412, a static memory 2414, and a storage unit 2416, both accessible to the Processors 2402 via the bus 2444. The main memory 2404, the static memory 2414, and storage unit 2416 store the instructions 2408 embodying any one or more of the methodologies or functions described herein. The instructions 2408 may also reside, completely or partially, within the main memory 2412, within the static memory 2414, within machine-readable medium 2418 within the storage unit 2416, within at least one of the Processors 2402 (e.g., within the Processor's cache memory), or any suitable combination thereof, during execution thereof by the machine 2400.

The I/O Components 2442 may include a wide variety of Components to receive input, provide output, produce output, transmit information, exchange information, capture measurements, and so on. The specific I/O Components 2442 that are included in a particular machine will depend on the type of machine. For example, portable machines such as mobile phones may include a touch input device or other such input mechanisms, while a headless server machine will likely not include such a touch input device. It will be appreciated that the I/O Components 2442 may include many other Components that are not shown in FIG. 24. In various example embodiments, the I/O Components 2442 may include output Components 2428 and input Components 2430. The output Components 2428 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 2430 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 2442 may include biometric Components 2432, motion Components 2434, environmental Components 2436, or position Components 2438, among a wide array of other Components. For example, the biometric Components 2432 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 2434 include acceleration sensor Components (e.g., accelerometer), gravitation sensor Components, rotation sensor Components (e.g., gyroscope), and so forth. The environmental Components 2436 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 2438 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 2442 further include communication Components 2440 operable to couple the machine 2400 to a network 2420 or devices 2422 via a coupling 2424 and a coupling 2426, respectively. For example, the communication Components 2440 may include a network interface Component or another suitable device to interface with the network 2420. In further examples, the communication Components 2440 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 2422 may be another machine or any of a wide variety of peripheral devices (e.g., a peripheral device coupled via a USB).

Moreover, the communication Components 2440 may detect identifiers or include Components operable to detect identifiers. For example, the communication Components 2440 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 2440, such as location via Internet Protocol (IP) geolocation, location via Wi-Fi® signal triangulation, location via detecting an NFC beacon signal that may indicate a particular location, and so forth.

The various memories (e.g., memory 2404, main memory 2412, static memory 2414, and/or memory of the Processors 2402) and/or storage unit 2416 may store one or more sets of instructions and data structures (e.g., software) embodying or used by any one or more of the methodologies or functions described herein. These instructions (e.g., the instructions 2408), when executed by Processors 2402, cause various operations to implement the disclosed embodiments.

The instructions 2408 may be transmitted or received over the network 2420, using a transmission medium, via a network interface device (e.g., a network interface Component included in the communication Components 2440) and using any one of a number of well-known transfer protocols (e.g., hypertext transfer protocol (HTTP)). Similarly, the instructions 2408 may be transmitted or received using a transmission medium via the coupling 2426 (e.g., a peer-to-peer coupling) to the devices 2422.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Example 1 is a method comprising: displaying a first virtual object in a display of an augmented reality (AR) device, the first virtual object corresponding to a first physical object in a physical environment of the AR device; tracking, using the AR device, a manipulation of the first virtual object by a user of the AR device, the manipulation of the first virtual object being relative to a second physical object in the physical environment or a second virtual object corresponding to the second physical object; identifying an initial state, a plurality of intermediate states, and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, the plurality of intermediate states being between the initial state and the final state; and programming by demonstration a robotic system using the tracking of the manipulation of the first virtual object relative to the second physical object or the second virtual object, the first initial state of the first virtual object, and the final state of the first virtual object.

Example 2 includes the method of example 1, wherein tracking further comprises: capturing three-dimensional spatial information of the physical environment with a sensor of the AR device; generating a three-dimensional point cloud based on the three-dimensional spatial information; identifying the first physical object and the second physical object from the three-dimensional point cloud; and rendering the first virtual object based on the identified first physical object.

Example 3 includes the method of example 2, further comprising: rendering the second virtual object based on the identified second physical object.

Example 4 includes the method of example 2, further comprising: identifying hand gestures of the user relative to the three-dimensional point cloud; tracking hand gestures of the user over a period of time; tracking, using a 6 degrees-of-freedom tracking system at the AR device, a pose of the AR device over the period of time; identifying a trajectory of the AR device based on the pose of the augmented reality device over the period of time; and identifying the manipulation of the first virtual object, the initial pose of the first virtual object, the final pose of the first virtual object based on the tracked hand gestures of the user and the trajectory of the AR device.

Example 5 includes the method of example 4, further comprising: adjusting a pose of the first virtual object based on the tracked hand gestures of the user over the period of time; and re-rendering the first virtual object in the display of the AR device based on the adjusted pose of the first virtual object, the first virtual object appearing to be anchored to hands of the user.

Example 6 includes the method of example 4, further comprising: receiving a request to start a recording of programming by demonstration at the AR device; and receiving a request to end the recording of programing by demonstration at the AR device, wherein the period of time corresponds to the request to start and the request to end the recording.

Example 7 includes the method of example 1, wherein the first virtual object includes a first 3D model of the first physical object, wherein the second virtual object includes a second 3D model of the second physical object.

Example 8 includes the method of example 7, wherein the first 3D model is a first scaled down version of the first physical object or a first scaled up version of the first physical object, wherein the second 3D model is a second scaled down version of the second physical object or a second scaled up version of the second physical object.

Example 9 includes the method of example 1, wherein first virtual object is displayed at a first location in the physical environment distinct from a second location of the first physical object in the physical environment.

Example 10 includes the method of example 1, wherein the first virtual object is displayed at the location of the first physical object in the physical environment.

Example 11 includes the method of example 1, wherein programming comprises: sending, to the robotic system, demonstration data indicating tracking of the manipulation of the first virtual object relative to the second physical object or the second virtual object, the first initial state of the first virtual object, a plurality of intermediate states of the first virtual object, and the final state of the first virtual object, wherein the robotic system is programmed using the demonstration data.

Example 12 includes the method of example 1, wherein programming comprises: sending, to a server, demonstration data indicating tracking of the manipulation of the first virtual object relative to the second physical object or the second virtual object, the first initial state of the first virtual object, and the final state of the first virtual object, wherein the server is configured to program by demonstration the robotic system using the demonstration data.

Example 13 is an augmented reality (AR) device comprising: a display; a processor; and a memory storing instructions that, when executed by the processor, configure the AR device to perform operations comprising: displaying a first virtual object in the display, the first virtual object corresponding to a first physical object in a physical environment of the AR device; tracking, using the AR device, a manipulation of the first virtual object by a user of the AR device, the manipulation of the first virtual object being relative to a second physical object in the physical environment or a second virtual object corresponding to the second physical object; identifying an initial state, a plurality of intermediate states, and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, the plurality of intermediate states being between the initial state and the final state; and providing, to another device, demonstration data indicating the tracking of the manipulation of the first virtual object relative to the second physical object or the second virtual object, the first initial state of the first virtual object, and the final state of the first virtual object.

Example 14 includes the AR device of example 13, wherein tracking further comprises: capturing three-dimensional spatial information of the physical environment with a sensor of the AR device; generating a three-dimensional point cloud based on the three-dimensional spatial information; identifying the first physical object and the second physical object from the three-dimensional point cloud; and rendering the first virtual object based on the identified first physical object.

Example 15 includes the AR device of example 14, wherein the operations comprise: rendering the second virtual object based on the identified second physical object.

Example 16 includes the AR device of example 14, wherein the operations comprise: identifying hand gestures of the user relative to the three-dimensional point cloud; tracking hand gestures of the user over a period of time; tracking, using a 6 degrees-of-freedom tracking system at the AR device, a pose of the AR device over the period of time; identifying a trajectory of the AR device based on the pose of the augmented reality device over the period of time; and identifying the manipulation of the first virtual object, the initial pose of the first virtual object, the final pose of the first virtual object based on the tracked hand gestures of the user and the trajectory of the AR device.

Example 17 includes the AR device of example 16, wherein the operations comprise: adjusting a pose of the first virtual object based on the tracked hand gestures of the user over the period of time; and re-rendering the first virtual object in the display of the AR device based on the adjusted pose of the first virtual object, the first virtual object appearing to be anchored to hands of the user.

Example 18 includes the AR device of example 16, wherein the operations comprise: receiving a request to start a recording of programming by demonstration at the AR device; and receiving a request to end the recording of programing by demonstration at the AR device, wherein the period of time corresponds to the request to start and the request to end the recording.

Example 19 is a non-transitory computer-readable storage medium, the computer-readable storage medium including instructions that when executed by a computer, cause the computer to: display a first virtual object in a display of an augmented reality (AR) device, the first virtual object corresponding to a first physical object in a physical environment of the AR device; track, using the AR device, a manipulation of the first virtual object by a user of the AR device, the manipulation of the first virtual object being relative to a second physical object in the physical environment or a second virtual object corresponding to the second physical object; identify an initial state, a plurality of intermediate states, and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, the plurality of intermediate states being between the initial state and the final state; and program by demonstration a robotic system using the tracking of the manipulation of the first virtual object relative to the second physical object or the second virtual object, the first initial state of the first virtual object, and the final state of the first virtual object.

Example 20 includes the computer-readable storage medium of example 19, wherein tracking further comprises: capture three-dimensional spatial information of the physical environment with a sensor of the AR device; generate a three-dimensional point cloud based on the three-dimensional spatial information; identify the first physical object and the second physical object from the three-dimensional point cloud; and render the first virtual object based on the identified first physical object.

What is claimed is:

1. A method comprising:

displaying a first virtual object in a display of an augmented reality (AR) device, the first virtual object corresponding to a first physical object in a physical environment of the AR device;

tracking, using the AR device, a manipulation of the first virtual object by a user of the AR device, the manipulation of the first virtual object being relative to a second physical object in the physical environment or a second virtual object corresponding to the second physical object;

identifying an initial state, a plurality of intermediate states, and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, the plurality of intermediate states being between the initial state and the final state; and programming by demonstration a robotic system using the tracking of the manipulation of the first virtual object relative to the second physical object or the second virtual object, the initial state of the first virtual object, and the final state of the first virtual object, wherein tracking the manipulation of the first virtual object comprises: identifying hand gestures of the user, tracking hand gestures of the user over a period of time, tracking, using a 6 degrees-of-freedom tracking system at the AR device, a pose of the AR device over the period of time, and identifying a trajectory of the AR device based on the pose of the AR device over the period of time; and wherein the initial pose of the first virtual object, the plurality of intermediate states, and the final pose of the first virtual object are based on the tracked hand gestures of the user and the trajectory of the AR device.

2. The method of claim 1, wherein tracking further comprises:
capturing three-dimensional spatial information of the physical environment with a sensor of the AR device;
generating a three-dimensional point cloud based on the three-dimensional spatial information;
identifying the first physical object and the second physical object from the three-dimensional point cloud; and
rendering the first virtual object based on the identified first physical object.

3. The method of claim 2, further comprising:
rendering the second virtual object based on the identified second physical object.

4. The method of claim 2, further comprising:
identifying the hand gestures of the user relative to the three-dimensional point cloud.

5. The method of claim 4, further comprising:
adjusting a pose of the first virtual object based on the tracked hand gestures of the user over the period of time; and
re-rendering the first virtual object in the display of the AR device based on the adjusted pose of the first virtual object, the first virtual object appearing to be anchored to hands of the user.

6. The method of claim 4, further comprising:
receiving a request to start a recording of programming by demonstration at the AR device; and
receiving a request to end the recording of programming by demonstration at the AR device,
wherein the period of time corresponds to the request to start and the request to end the recording.

7. The method of claim 1, wherein the first virtual object includes a first 3D model of the first physical object, wherein the second virtual object includes a second 3D model of the second physical object.

8. The method of claim 7, wherein the first 3D model is a first scaled down version of the first physical object or a first scaled up version of the first physical object, wherein the second 3D model is a second scaled down version of the second physical object or a second scaled up version of the second physical object.

9. The method of claim 1, wherein the first virtual object is displayed at a first location in the physical environment distinct from a second location of the first physical object in the physical environment.

10. The method of claim 1, wherein the first virtual object is displayed at a location of the first physical object in the physical environment.

11. The method of claim 1, wherein programming comprises:
sending, to the robotic system, demonstration data indicating tracking of the manipulation of the first virtual object relative to the second physical object or the second virtual object, the initial state of the first virtual object, the plurality of intermediate states of the first virtual object, and the final state of the first virtual object,
wherein the robotic system is programmed using the demonstration data.

12. The method of claim 1, wherein programming comprises:
sending, to a server, demonstration data indicating tracking of the manipulation of the first virtual object relative to the second physical object or the second virtual object, the initial state of the first virtual object, and the final state of the first virtual object,
wherein the server is configured to program by demonstration the robotic system using the demonstration data.

13. An augmented reality (AR) device comprising:
a display;
a processor; and
a memory storing instructions that, when executed by the processor, configure the AR device to perform operations comprising:
displaying a first virtual object in the display, the first virtual object corresponding to a first physical object in a physical environment of the AR device;
tracking, using the AR device, a manipulation of the first virtual object by a user of the AR device, the manipulation of the first virtual object being relative to a second physical object in the physical environment or a second virtual object corresponding to the second physical object;
identifying an initial state, a plurality of intermediate states, and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, the plurality of intermediate states being between the initial state and the final state; and
providing, to another device, demonstration data indicating the tracking of the manipulation of the first virtual object relative to the second physical object or the second virtual object, the initial state of the first virtual object, and the final state of the first virtual object,
wherein tracking the manipulation of the first virtual object comprises: identifying hand gestures of the user, tracking hand gestures of the user over a period of time, tracking, using a 6 degrees-of-freedom tracking system at the AR device, a pose of the AR device over the period of time, and identifying a trajectory of the AR device based on the pose of the AR device over the period of time; and
wherein the initial pose of the first virtual object, the plurality of intermediate states, and the final pose of the first virtual object are based on the tracked hand gestures of the user and the trajectory of the AR device.

14. The AR device of claim 13, wherein tracking further comprises:
capturing three-dimensional spatial information of the physical environment with a sensor of the AR device;
generating a three-dimensional point cloud based on the three-dimensional spatial information;
identifying the first physical object and the second physical object from the three-dimensional point cloud; and
rendering the first virtual object based on the identified first physical object.

15. The AR device of claim 14, wherein the operations comprise:
rendering the second virtual object based on the identified second physical object.

16. The AR device of claim 14, wherein the operations comprise:
Identifying the hand gestures of the user relative to the three-dimensional point cloud.

17. The AR device of claim 16, wherein the operations comprise:

adjusting a pose of the first virtual object based on the tracked hand gestures of the user over the period of time; and re-rendering the first virtual object in the display of the AR device based on the adjusted pose of the first virtual object, the first virtual object appearing to be anchored to hands of the user.

18. The AR device of claim 16, wherein the operations comprise:

receiving a request to start a recording of programming by demonstration at the AR device; and receiving a request to end the recording of programming by demonstration at the AR device, wherein the period of time corresponds to the request to start and the request to end the recording.

19. A non-transitory computer-readable storage medium, the computer-readable storage medium including instructions that when executed by a computer, cause the computer to:

display a first virtual object in a display of an augmented reality (AR) device, the first virtual object corresponding to a first physical object in a physical environment of the AR device;

track, using the AR device, a manipulation of the first virtual object by a user of the AR device, the manipulation of the first virtual object being relative to a second physical object in the physical environment or a second virtual object corresponding to the second physical object;

identify an initial state, a plurality of intermediate states, and a final state of the first virtual object based on the tracking, the initial state corresponding to an initial pose of the first virtual object relative to the second physical object or the second virtual object, the final state corresponding to a final pose of the first virtual object relative to the second physical object or the second virtual object, the plurality of intermediate states being between the initial state and the final state; and program by demonstration a robotic system using the tracking of the manipulation of the first virtual object relative to the second physical object or the second virtual object, the initial state of the first virtual object, and the final state of the first virtual object, wherein tracking the manipulation of the first virtual object comprises: identifying hand gestures of the user, tracking hand gestures of the user over a period of time, tracking, using a 6 degrees-of-freedom tracking system at the AR device, a pose of the AR device over the period of time, and identifying a trajectory of the AR device based on the pose of the AR device over the period of time; and wherein the initial pose of the first virtual object, the plurality of intermediate states, and the final pose of the first virtual object are based on the tracked hand gestures of the user and the trajectory of the AR device.

20. The computer-readable storage medium of claim 19, wherein tracking further comprises:

capture three-dimensional spatial information of the physical environment with a sensor of the AR device;

generate a three-dimensional point cloud based on the three-dimensional spatial information;

identify the first physical object and the second physical object from the three-dimensional point cloud; and render the first virtual object based on the identified first physical object.

\* \* \* \* \*